United States Patent
Arcuri et al.

(12)

(10) Patent No.: US 6,262,131 B1
(45) Date of Patent: Jul. 17, 2001

(54) STRUCTURED FISCHER-TROPSCH CATALYST SYSTEM AND METHOD

(75) Inventors: Kym B Arcuri, Tulsa; Kenneth L. Agee, Bixby; Mark A. Agee, Tulsa, all of OK (US)

(73) Assignee: Syntroleum Corporation, Tulsa, OK (US)

( * ) Notice: Subject to any disclaimer, the term of this patent is extended or adjusted under 35 U.S.C. 154(b) by 0 days.

(21) Appl. No.: 09/455,047

(22) Filed: Dec. 6, 1999

Related U.S. Application Data

(60) Provisional application No. 60/111,312, filed on Dec. 7, 1998, and provisional application No. 60/148,805, filed on Aug. 12, 1999.

(51) Int. Cl.[7] .............................. C07C 27/00; B01J 23/02
(52) U.S. Cl. .................. 518/700; 518/706; 502/527.18; 502/527.19; 502/527.23
(58) Field of Search ................... 518/700, 706; 502/527.23, 527.18, 527.19

(56) References Cited

U.S. PATENT DOCUMENTS

| | | | |
|---|---|---|---|
| Re. 34,853 | 2/1995 | DeAngelis et al. | 502/439 |
| 4,442,218 | 4/1984 | Amos et al. | 436/525 |
| 4,464,475 | 8/1984 | Beall et al. | 501/9 |
| 4,514,499 | 4/1985 | Noll | 435/240 |
| 4,541,855 | 9/1985 | Scherer | 65/18.1 |
| 4,574,459 | 3/1986 | Peters | 29/527 |
| 4,631,268 | 12/1986 | Lachman et al. | 502/439 |
| 4,637,995 | 1/1987 | DeAngelis et al. | 502/439 |
| 4,771,029 | 9/1988 | Pereira et al. | 502/355 |
| 4,833,170 | 5/1989 | Agee | 518/703 |
| 4,877,766 | 10/1989 | Frost | 502/439 |
| 4,973,453 | 11/1990 | Agee | 422/190 |
| 4,979,889 | 12/1990 | Frost | 425/192 |
| 5,286,323 | 2/1994 | Bagley | 156/89 |
| 5,308,556 | 5/1994 | Bagley | 264/13 |
| 5,376,341 | 12/1994 | Gulati | 422/179 |
| 5,418,204 | 5/1995 | Kolaczkowski et al. | 502/439 |
| 5,427,601 | 6/1995 | Harada et al. | 75/235 |
| 5,545,674 | 8/1996 | Behrmann et al. | 518/715 |
| 5,639,401 | 6/1997 | Jacobs et al. | 252/373 |
| 5,641,332 | 6/1997 | Faber et al. | 55/523 |
| 5,658,372 | 8/1997 | Gadkaree | 95/116 |
| 5,716,899 | 2/1998 | Guile et al. | 502/439 |
| 5,776,988 | 7/1998 | Chaumette et al. | 518/715 |
| 5,786,393 | 7/1998 | Chaumette et al. | 518/700 |

FOREIGN PATENT DOCUMENTS

| | | | |
|---|---|---|---|
| 0 308 034 A2 | 3/1989 | (EP) | B01J/8/06 |
| 0605142A1 | 6/1994 | (EP) | B01J/23/02 |
| 2 160 542 | 6/1985 | (GB) | C07C/1/02 |
| WO 9604200A1 | 2/1996 | (WO) | C01B/3/38 |
| WO 98/38147 | 9/1998 | (WO) | C07C/1/04 |

OTHER PUBLICATIONS

International Search Report mailed Apr. 13, 2000 for International Application PCT/US99/28905, Apr. 13, 2000.

J. H. Crowell, et al., Fischer–Tropsch Oil Circulation Processes, *Industrial and Engineering Chemistry*, vol. 42, No. 11, pp. 2376–2384, May 4, 1950.

Baird, et al., "Fischer–Tropsch Processes Investigated at the Pittsburgh Energy Technology Center since 1944", pp. 175–191, *Ind. Eng. Chem. Prod. Res. Dev.* 1980.

*Primary Examiner*—Johann Richter
*Assistant Examiner*—J. Parsa
(74) *Attorney, Agent, or Firm*—Baker Botts L.L.P.

(57) ABSTRACT

A Fischer-Tropsch catalyst for the conversion of synthesis gas into Fischer-Tropsch products includes a stationary Fischer-Tropsch catalyst having a voidage ratio greater than approximately 0.45 or 0.6 and may further have a catalyst concentration for a given reactor volume of at least 10 percent. A Fischer-Tropsch catalyst has a structured shape promoting non-Taylor flow and/or producing a productivity in the range of 200–4000 vol CO/vol. Catalyst/hour or greater over at least a 600 hour run of a Fischer-Tropsch reactor with the catalyst therein. A system for converting synthesis gas into longer-chain hydrocarbon products through the Fisher-Tropsch reaction has a reactor for receiving synthesis gas directly or as a saturated hydrocarbon liquid or a combination, and a stationary, structured Fischer-Tropsch catalyst disposed within the reactor for converting at least a portion of the synthesis gas into longer-chain hydrocarbons through Fischer-Tropsch reaction. A Fischer-Tropsch reactor system having a structured Fischer-Tropsch catalyst may have an all-liquid saturated reactant feed, an all gas reactant feed, or a plethora of combinations therebetween. The systems may or may not include heat removal devices. Methods of manufacturing catalysts and converting synthesis gas are also presented.

9 Claims, 6 Drawing Sheets

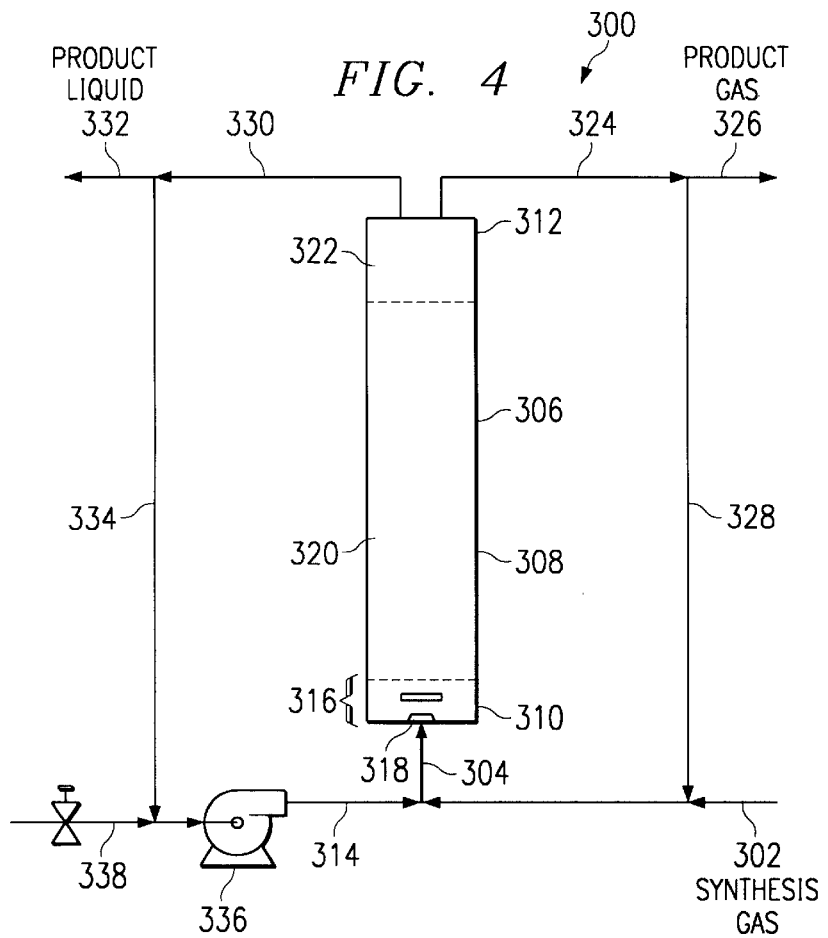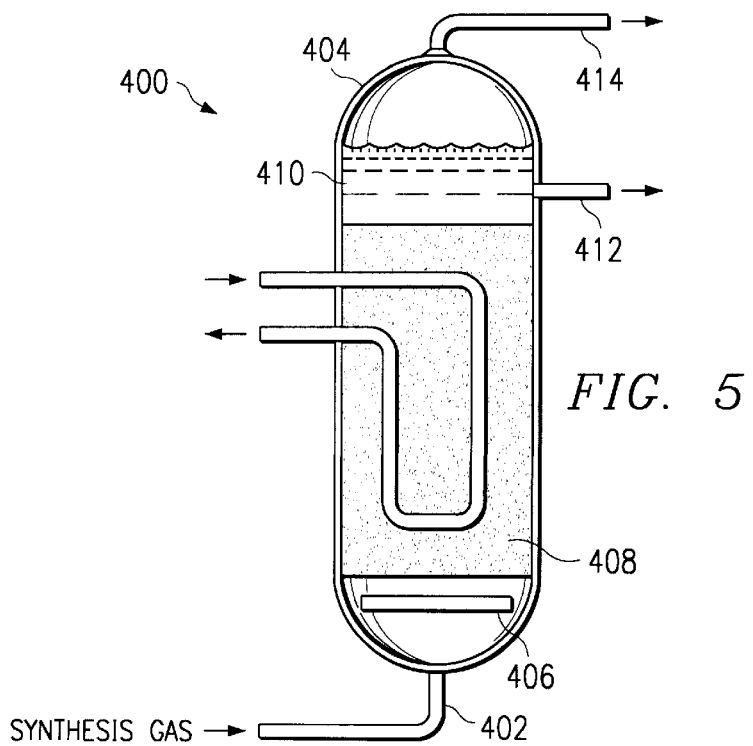

STRUCTURED FISCHER-TROPSCH CATALYST SYSTEM AND METHOD

RELATED APPLICATIONS

This application claims the benefit of U.S. Provisional Application Ser. No. 60/111,312 filed Dec. 7, 1998 and U.S. Provisional Application Ser. No. 60/148,805 filed Aug. 12, 1999.

TECHNICAL FIELD OF THE INVENTION

The present invention relates to Fischer-Tropsch catalysts systems and processes for the production of heavier hydrocarbons from lighter hydrocarbons.

BACKGROUND OF THE INVENTION

A. Introduction to the Fischer Tropsch Process

The synthetic production of hydrocarbons by the catalytic reaction of carbon monoxide and hydrogen is well known and is generally referred to as the Fischer-Tropsch reaction. The Fischer-Tropsch process was developed in early part of the 20$^{th}$ century in Germany. It has been practiced commercially in Germany during World War II and later in South Africa.

The Fischer-Tropsch reaction for converting synthesis gas (primarily CO and $H_2$) has been characterized by the following general reaction:

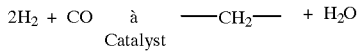

The hydrocarbon products derived from the Fischer-Tropsch reaction range from methane to high molecular weight paraffinic waxes containing more than 100 carbon atoms.

Numerous catalysts have been used in carrying out the reaction, and both saturated and unsaturated hydrocarbons can be produced. The synthesis reaction is very exothermic and temperature sensitive whereby temperature control is required to maintain a desired hydrocarbon product selectivity.

B. Introduction to Synthesis Gas Production

Synthesis gas may be made from natural gas, gasified coal, and other sources. Three basic methods have been employed for producing the synthesis gas ("syngas"), which is substantially carbon monoxide and molecular hydrogen, utilized as feedstock in the Fischer-Tropsch reaction. The two traditional methods are steam reforming, wherein one or more light hydrocarbons such as methane are reacted with steam over a catalyst to form carbon monoxide and hydrogen, and partial oxidation, wherein one or more light hydrocarbons are combusted sub-stoichiometrically to produce synthesis gas. The steam reforming reaction is endothermic, and a catalyst containing nickel is often utilized. Partial oxidation is the catalytic or non-catalytic, sub-stoichiometric combustion of light hydrocarbons such as methane to produce the synthesis gas. The partial oxidation reaction is typically carried out using high purity oxygen. High purity oxygen, however, can be quite expensive.

In some situations these synthesis gas production methods may be combined to form the third method. A combination of partial oxidation and steam reforming, known as autothermal reforming, wherein air (or $O_2$) is used as a source of oxygen for the partial oxidation reaction has also been used for producing synthesis gas heretofore. Autothermal reforming is a combination of partial oxidation and steam reforming where the exothermic heat of the partial oxidation supplies the necessary heat for the endothermic steam reforming reaction. The autothermal reforming process can be carried out in a relatively inexpensive refractory lined carbon steel vessel whereby low cost is typically involved.

The autothermal process results in lower hydrogen to carbon monoxide ratio in the synthesis gas than does steam reforming alone. That is, the steam reforming reaction with methane results in a ratio of about 3:1 or higher while the partial oxidation of methane results in a ratio of less than about 2:1. A good ratio for the hydrocarbon synthesis reaction carried out at low or medium pressure (i.e., in the range of about atmospheric to 500 psig) over a cobalt catalyst is about 2:1. When the feed to the autothermal reforming process is a mixture of light shorter-chain hydrocarbons, such as a natural gas stream, some form of additional control is required to maintain the ratio of hydrogen to carbon monoxide in the synthesis gas at the optimum ratio (for cobalt based FT catalysts) of about 2:1. For this reason steam and/or $CO_2$ may be added to the synthesis gas reactor to adjust the $H_2$/CO ratio to the desired value with the goal of optimizing process economics.

C. Introduction to F-T Reactors and Techniques

Numerous types of reactor systems have been used for carrying out the Fischer-Tropsch reaction. The developed Fischer-Tropsch reactor systems have included conventional fixed-bed, three-phase slurry bubble column designs, fluidized and/or moving bed, and ebullating beds to name a few. Due to the complicated interplay between heat and mass transfer and the relatively high cost of Fischer-Tropsch catalysts, no single reactor design has dominated the recent commercial development efforts.

Fixed-bed reactors have individual catalyst particles (typically less than 15 mm in the characteristic diameter) packed into tubes in cylindrical vessels. The individual particles of various shapes such as trilobes, spheres or cylinders, typically contain voidages on the order of about 0.3 to 0.5 depending upon the specific particle shape. These reactors offer simplicity and conversion kinetics that are easy to scale up to commercial sized units. Due to the high heat release and relatively low mass velocity associated with commercial operations, however, the reactor tube sizes are kept relatively small (typically less than two or three inches) when operating with a gas continuous system.

Fixed-bed Fischer-Tropsch reaction systems are primarily constrained by pressure drop and heat transport limitations. High productivity and good methane selectivity generally can be achieved with small particle sizes, typically on the order of less than 200 microns. In this context, "selectivity" refers to the following ratio: (moles of referenced product formed)/(mole of CO converted). The pressure drop, however, limits the practical application to much larger particle sizes for use in fixed-bed reactor systems. Shaped extrudates (trilobes, quadralobes, etc.) in the range of about 1/64 to 1/8 inch in diameter are frequently used. Smaller size extrudates are infrequently used because they are difficult to manufacture in commercial quantities and create high pressure drops across the bed.

The heat transfer characteristics of such fixed-bed reactors are generally poor because of the relatively low mass velocity. If one attempts, however, to improve the heat transfer by increasing the velocity, higher CO conversion, which is the commercial goal, can be obtained but there is an excessive pressure drop across the reactor, which limits commercial viability. In order to obtain the CO conversions desired and gas throughputs of commercial interest, the needed conditions result in a high radial temperature profile. Due to the high heat of reaction, Fischer-Tropsch fixed-bed reactor diameters are generally less than three inches to avoid excessive radial temperature profiles. The use of high-activity catalysts in Fischer-Tropsch fixed-bed reactors, which must handle a large exothermic heat of reaction and which have poor effective thermal conductivity in the packed bed, may cause large radial temperature profiles to exist.

Further, the use of catalyst particle sizes greater than 1/64 of an inch to avoid excessive pressure drop through the reactor results in high methane selectivity and low selectivities toward the high molecular weight paraffins, which generally have more economic value. This selectivity is due to a disproportional catalyst pore diffusion limitation on the rate of transport of reactants—CO and $H_2$—into the interior of the catalyst pellets. To address the situation, the use of catalysts having the active metal component restricted to a thin layer about the outer edge of the particle has been suggested. These catalysts appear costly to prepare and do not appear to make good use of the available reactor volume. Other fixed-bed reactor system alterations have also been proposed.

U.S. Pat. No. 5,786,393 presents the use of liquid recycles as a means of improving the overall performance in a fixed-bed design. This art has been referred to by some as a "trickle bed" reactor (as part of a subset of fixed-bed reactor systems) in which both reactant gas and an inert liquid are introduced (preferably in an upflow or down flow orientation with respect to the catalyst) simultaneously. The presence of the flowing reactant gas and liquid improves overall reactor performance with respect to CO conversion and product selectivity. In a number of respects, however, the trickle-bed reactor system remains limited.

A limitation to the trickle bed system as well as to any fixed-bed design is the pressure drop associated with operating at high mass velocities. The gas-filled voidage in fixed-beds (typically <0.45) does not permit high mass velocities without excessive pressure drops. What is considered an "excessive pressure drop" will vary with the reactor and situation based primarily on operational cost concerns, e.g., compressor sizing and cost, and catalyst pellet strength concerns because too high a pressure drop can cause particle attrition/crushing. Consequently, the mass throughput undergoing conversion per unit reactor volume is limited due to the heat transfer rates. Increasing the individual catalyst particle size may slightly improve heat transfer by allowing higher mass velocities (for a given pressure drop), but the loss in selectivity toward the high boiling point products and the increase in methane selectivity combined with the increase in catalyst activity generally offset the commercial incentives of higher heat transfer.

In addition to the heat transfer limitations associated with fixed-bed reactors, Fischer-Tropsch catalyst performance is sensitive to mass transfer limitations within the reactor and the individual catalyst volume. It is known that Fischer-Tropsch product selectivity is sensitive to the $H_2/CO$ feed ratio. Increasing this ratio leads to poor selectivity (i.e. high methane and lower boiling point liquids), but the catalyst productivity, which may be indicated by the expression: (volume CO converted)/(volume of catalyst-hour), increases. In fixed-bed operations that employ large catalyst particles with relatively long diffusion lengths, the $H_2/CO$ ratio within the catalyst volume can change significantly. Consequently when utilizing larger catalyst particles to mitigate pressure drop and improve the heat transfer (through increasing mass velocity), the performance of the Fischer-Tropsch fixed-bed catalyst systems may degrade due to longer intra-particle diffusion distances resulting in increasing $H_2/CO$ ratios. This degradation influences performance through lower productivities and lower selectivities towards higher-valued products.

Fischer-Tropsch three-phase bubble column reactors generally offer advantages over the fixed-bed design in terms of heat transfer and diffusion characteristics. Numerous designs that incorporate small catalyst particles suspended by the upflowing gas, which bubbles through a liquid continuous matrix. In this design, reactor diameters are no longer limited by heat transfer characteristics. The motion of the liquid continuous matrix allows sufficient heat transfer to achieve higher commercial productivity (e.g., >200 vol. CO converted/vol. Cat.—hour). The catalyst particles are moving within a liquid continuous phase, resulting in high heat transfer from the individual particles, while the large liquid inventory in the reactor provides a high degree of thermal inertia, which helps prevent rapid temperature increases that can lead to thermal runaway. Further, the small particle size minimizes the negative impact of diffusional resistances within the interior of the catalyst.

The major technical issues associated with three-phase bubble columns include hydrodynamics and solids management. Reactor parameters should be selected to allow sufficient gas/liquid contacting while operating at gas throughputs that achieve the desired residence time and CO conversion levels. In this reactor type the $H_2$ and CO reactants should transfer from the feed gas (bubbled into the reactor volume) into the liquid phase. Once in the liquid phase, the dissolved reactants contact the catalytic surface to undergo reaction. The transfer of reactants from the liquid phase to the catalyst surface depends upon the turbulence of the liquid continuous phase and the diffusional length to the catalytic surface. Smaller catalyst particles are preferred in slurry reactors to avoid mass transfer limitations that lead to unacceptable product selectivity.

Small particles can be used in these systems because they are readily fluidized by the gas flow. The pressure drop across the reactor is limited to approximately the static head of the bed. Small particles, because of their large surface area also result in improved liquid-solid mass transfer compared to fixed-bed Fischer-Tropsch hydrocarbon synthesis reactors. Ultimately, the particle size is limited by the solids management system. The large ratio of liquid volume to catalyst used in slurry reactor systems provides a large reservoir of dissolved $H_2$ and CO, which improves operability of the catalyst system.

Liquid-phase back-mixing, however, which is reported to be a strong function of reactor diameter, can result in a much lower kinetic driving force that requires more reactor volume than a fixed-bed reactor operating at the same conversion. The need to have sufficient gas-liquid-solid mixing and liquid-solid separation complicates the equipment requirements and scale-up issues associated with commercial designs.

With respect to the latter, solids management issues, there are number of issues that complicate slurry reactor systems. First, the gas distributor itself can be a major issue. A distributor is desired that distributes in a more or less uniform manner across a potentially very large diameter while preventing "dead" zones in which the catalyst can settle out/down and lay on the reactor bottom. The reactor bottom itself may be the distributor. Second, catalyst/wax separation can be a significant technical hurdle, which limits minimum catalyst particle size and can be very negatively impacted by catalyst particle attrition—especially over long time periods and/or in concert with poorly designed gas distributors.

Commercial designs of fixed-bed and three-phase slurry reactors typically utilize boiling water to remove the heat of reaction. In the fixed-bed design, the individual reactor tubes are located within a jacket containing water. The heat of reaction raises the temperature of the catalyst bed within each tube. This thermal energy is transferred to the tube wall forcing the water to boil within the jacket. In the slurry design, tubes are typically placed within the slurry volume and heat is transferred from the liquid continuous matrix to the tube walls. The production of steam within the tubes provides the needed cooling. The steam in turn is cooled/condensed in another heat exchanger outside of the reactor. All the required heat removal devices can be a considerable capital cost in building a commercial plant as well as the source of numerous technical difficulties.

Fluidized bed type Fischer-Tropsch reactors also give much better heat transfer characteristics than fixed bed reactors and can employ very small catalyst particles. These reactors operate essentially "dry", which means that the production rates of species which are liquid at reactor conditions must be very low, approaching zero. Otherwise, rapid catalyst defluidization can occur. In practice, this requires very high reactor operating temperatures, which typically lead to high selectivities to methane and the production of a number of less desirable chemical species, such as aromatics. Catalyst/gas separation can also be a significant technical and economic hurdle with fluidized bed systems.

A reactor system has been proposed in PCT Application WO 98/38147 that uses a parallel-channel monolithic catalyst support to provide a fixed, dispersed catalyst arrangement. The embodiments discussed and presented include a catalyst with elongated monolithic support (e.g., 10 cm axial length) with active metals incorporated into lengthwise channels. The application contemplates using this catalyst in a Taylor flow regime. "Taylor flow regime" typically signifies a small capillary flow having a large axial dimension compared to the effective radial dimension, e.g., L/D>1000. It is such that entrance effects are not a real factor-it is not regarded as very turbulent. A Taylor flow of gas and liquid in a channel may be defined as periodic cylindrical gas bubbles in the liquid having almost the same diameter as the channel and without entrained gas bubbles between successive cylindrical bubbles.

D. Improved Economics Desired

It has been a quest for many to improve the economics of processes utilizing the Fischer-Tropsch reaction. Improved economics will allow for wide-scale adoption of the process in numerous sites and for numerous applications. Efforts have been made to improve economics, but further improvements are desirable. See for example U.S. Pat. Nos. 4,883,170 and 4,973,453, which are incorporated by reference herein for all purposes.

SUMMARY OF THE INVENTION

Therefore, a need has arisen for a catalyst, reactor, system and method that address disadvantages and problems associated with previously developed synthesis catalysts, reactor systems, and methods. According to an aspect of the present invention, a Fischer-Tropsch catalyst for the conversion of synthesis gas into Fischer-Tropsch products includes a structured Fischer-Tropsch catalyst having a voidage ratio greater than approximately 0.45 or 0.6. According to another aspect of the present invention, a Fischer-Tropsch catalyst for the conversion of synthesis gas to Fischer-Tropsch products includes a Fischer-Tropsch catalyst with a voidage ratio greater than or equal to 0.4 and a catalyst concentration for a given reactor volume of at least 10 percent.

According to another aspect of the present invention, a Fischer-Tropsch catalyst for the conversion of synthesis gas into Fischer-Tropsch products includes a stationary Fischer-Tropsch catalyst formed with an structured shape. According to another aspect of the present invention, a Fischer-Tropsch catalyst for the conversion of synthesis gas to Fischer-Tropsch products includes a stationary, structured Fischer-Tropsch catalyst having a voidage ratio of 0.4 or greater and operable to produce a productivity in the range of 200–4000 vol CO/vol.

Catalyst/hour or greater over at least a 600 hour run of a Fischer-Tropsch reactor with the catalyst therein.

According to another aspect of the present invention, a method of manufacturing a Fischer-Tropsch catalyst for the conversion of synthesis gas into Fischer-Tropsch products including the steps of providing a support having a voidage ratio greater than 0.6 and associating an active metal with the support.

According to another aspect of the present invention, a system for converting synthesis gas into longer-chain hydrocarbon products through the Fisher-Tropsch reaction includes a reactor for receiving synthesis gas directly or as a saturated hydrocarbon liquid, and a structured Fischer-Tropsch catalyst disposed within the reactor for converting at least a portion of the synthesis gas into longer-chain hydrocarbons through Fischer-Tropsch reaction.

According to another aspect of the present invention, a system for converting synthesis gas into longer-chain hydrocarbon products through the Fisher-Tropsch reaction includes: saturator unit for substantially saturating a hydrocarbon liquid with synthesis gas introduced into the saturator; a reactor fluidly coupled to the saturator unit for receiving a saturated hydrocarbon liquid therefrom; and a structured Fischer-Tropsch catalyst disposed within the reactor for converting at least a portion of a saturated hydrocarbon liquid into longer-chain hydrocarbons through Fischer-Tropsch reaction.

According to another aspect of the present invention, a system for converting synthesis gas into longer-chain hydrocarbon products through the Fisher-Tropsch reaction includes a saturator unit for substantially saturating a hydrocarbon liquid with synthesis gas introduced into the saturator; a reactor fluidly coupled to the saturator unit for receiving a saturated hydrocarbon liquid therefrom; a structured Fischer Tropsch catalyst disposed within the reactor for converting at least a portion of a saturated hydrocarbon liquid into longer-chain hydrocarbons through a Fischer-Tropsch reaction; and a plurality of tubes disposed within the reactor for removing heat from the reactor.

According to another aspect of the present invention, a method for converting synthesis gas into longer-chain hydrocarbon products through the Fisher-Tropsch reaction includes the steps of: disposing a structured Fischer-Tropsch catalyst within a Fischer-Tropsch reactor; supplying synthesis gas directly or as a saturated hydrocarbon liquid to the Fischer-Tropsch reactor to produce a Fischer-Tropsch product; and removing the Fischer-Tropsch product from the reactor.

The present invention provides advantages; a number of examples follow. An advantage of the present invention, in one embodiment, is that the high liquid flow rate through the structured catalyst minimizes the heat exchange devices and transfer area required for removing the heat of reaction, and further, in some embodiments, allows such a large portion of the heat to be removed that internal heat exchange devices are not required.

Another advantage is that heat removal may be accomplished readily without requiring complicated material management issues to be addressed as with slurry reactors. Another advantage of the present invention, in at least one embodiment, is that reactors may be oriented more readily with the longitudinal axis perpendicular to gravity, i.e., a horizontal reactor may be obtained. This facilitates application of the invention on ships and barges.

Another advantage of the present invention is that the use of a structured catalyst permits the design of a commercial Fischer-Tropsch reactor possessing a liquid continuous matrix within the liquid volume while maintaining a catalytic surface area that is stationary, and this in turn allows heat transfer characteristics that may be equal to or better than the conventional three-phase slurry designs without the problems involving gas distribution and catalyst/wax separation that tend to plague three phase slurry reactor designs. Another advantage is that the structured catalyst, which is stationary, facilitates scale up and avoids the complicated scale-up issues of slurry reactors associated with, among other things, solids mixing and management within the reactor volume. Yet another advantage of the present invention is that it may allow higher catalyst concentrations per reactor volume compared to a three-phase slurry reactors. Another advantage of the invention is that the lack of movement of the catalyst particles prevents the establishment of large-scale liquid convection currents/cells, which lead to very high degrees of liquid back mixing in commercial scale three-phase slurry reactors, and thus, the reactor systems using the structured catalyst behave in a very plug-flow-like manner even at very large (i.e., commercial-size) reactor diameters.

BRIEF DESCRIPTION OF THE DRAWINGS

For a more complete understanding of the present invention and advantages thereof, reference is now made to the following description taken in conjunction with the accompanying drawings in which like reference numbers indicate like features, and wherein:

FIG. 4 is an embodiment of a Fischer-Tropsch reactor system according to an aspect of the present invention;

FIG. 5 is an embodiment of a Fischer-Tropsch reactor system with an all-gas reactant feed according to an aspect of the present invention;

DETAILED DESCRIPTION OF THE INVENTION

Figure 1:
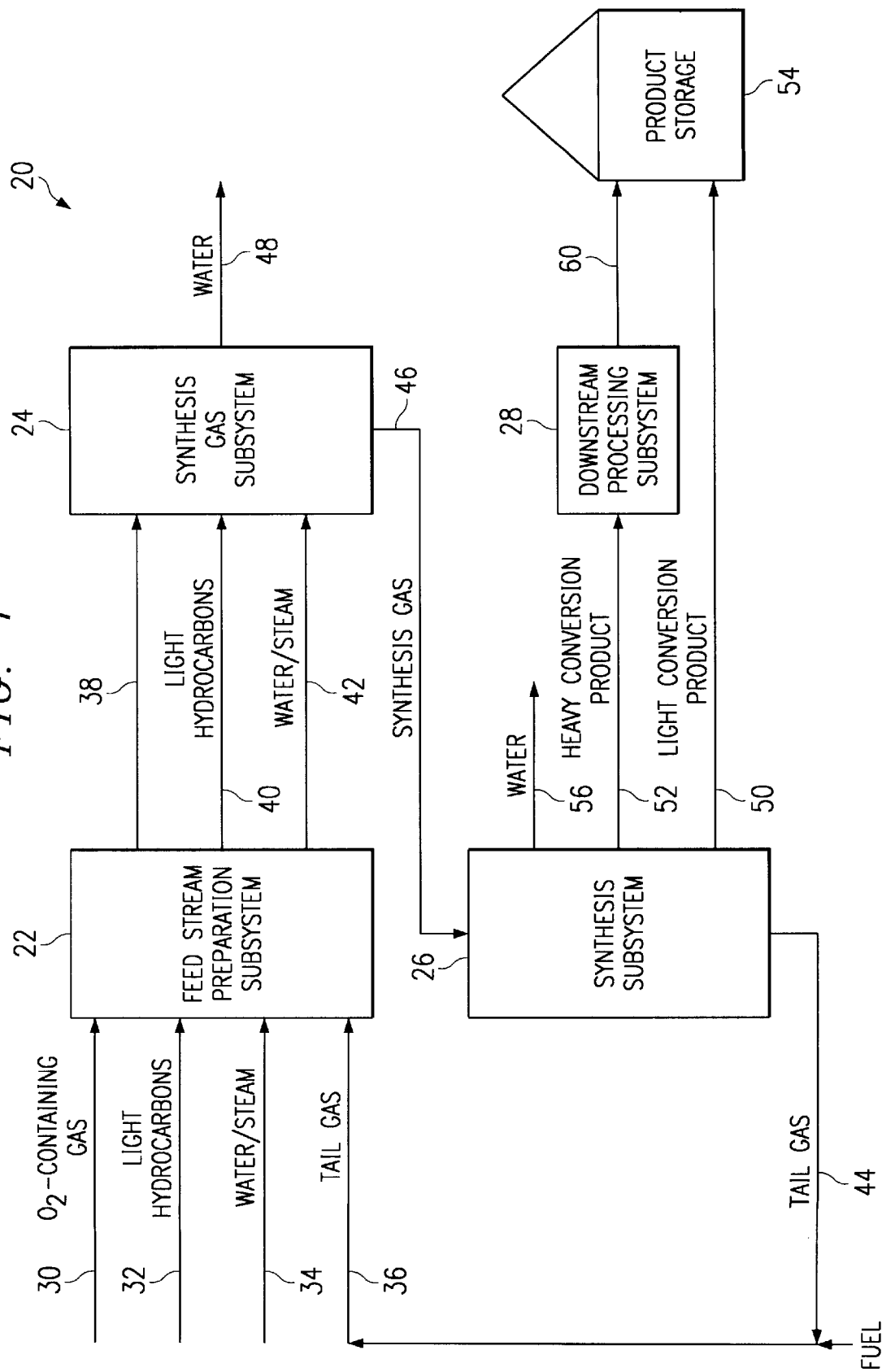
FIG. 1 is a schematic diagram of an illustrative system for converting light hydrocarbons into heavier hydrocarbons involving a Fischer-Tropsch reaction.

The preferred embodiment of the present invention and its advantages are best understood by referring to FIGS. 1–7 of the drawings, like numerals being used for like and corresponding parts of the various drawings. An important aspect of the present invention is the formation and use of a structured Fischer-Tropsch catalyst.

A. Structured Catalyst

The structured Fischer-Tropsch catalyst system includes an active metal for promoting the Fischer Tropsch reaction formed as part of or on a structured catalyst support. By the term "structured FischerTropsch catalyst" means a stationary, high-voidage (0.45 or higher inter particle void fraction) FischerTropsch catalyst having a geometry that promotes nonTaylor flow (minimizes laminar flow); the structured Fischer-Tropsch catalyst promotes non-Taylor flow by having flow paths within a stationary bed with a mean length/diameter ratio (L/D) less than about 100, and preferably less than 10. L/D refers to the characteristic length divided by the characteristic diameter of the mixing void space, i.e., the space where mixing occurs between solid particles; for example, on a monolith segment that is 6 inches long with internal channel diameters of an $\frac{1}{16}$ of inch, the L/D=96. This is contrasted with those that enhance Taylor flow which possess length/diameter ratios that are usually much greater than 1,000. "Stationary" indicates that there is no large-scale movement of the catalyst in the reactor. There may be some "jiggling" at high flow rates, but not large movements of the catalyst as with slurry, ebullating, or fludized beds. The structured catalyst may be a metal-supported catalyst, ceramic-suported catalyst, short segments of monolith material (sized to avoid Taylor flow), but the structured catalyst may take other forms as well. The structured Fischer-Tropsch catalyst includes a plethora of embodiments. The categories of catalyst embodiments may be described by various physical properties and performance criteria discussed further below.

The active metals, which are included with or applied to the support, may include any known substance for promoting the Fischer-Tropsch reaction. For example, metals such as cobalt, iron, and ruthenium may be used. The type of active metal used is not an important aspect of the present invention and will vary with the conditions of the system using the structured catalyst, but a cobalt catalyst with a structured alumina support is a preferred catalyst. Any material (species) may be used as a catalyst support, such as aluminas, silicas, titanias, zirconias, carbon, zeolites, etcetera. Various promoters might be added as well; for example, one of the following promoters might be used: La, Ce, Hf, Ti, Si, Zr, Ru, Re, Pt, or Pd to name a few.

The structured catalyst may include a catalyst with a metallic, inorganic, or other component within the core volume that possesses a higher thermal conductivity than that of most catalyst support materials with uniform voidage. It may be of a material that has a relatively high thermal conductivity compared to inorganic supports (i.e., alumina, titania and silica based materials). For example, using a metal based material as the core of the structured catalyst as opposed to inorganic oxides improves the overall catalyst bed conductivity since the metal core packing has a higher conductivity than inorganic oxides. In other embodiments, the structured catalyst may also contain an inorganic core material that has a much lower pore volume than that typically employed for catalyst supports, e.g., >75% lower with respect to pore volume. The lower pore volume (intraparticle voidage) of the interior volume in such a catalyst allows the catalyst bed to possess a higher overall thermal conductivity compared to the case where the catalyst has a uniform (and higher) intraparticle voidage through the entire solid volume. The external surfce area of the structured catalyst possess a higher voidage than that in the interior if desired. The external surface refers to the volume of the structured catalyst corresponding to a depth of approximately 50 to 300 microns. This external area can be made with different materials (a coating) on the higher conductivity material located within the internal volume of the catalyst.

The structured catalyst preferably allows a high liquid flow rate through it, but promotes a non-Taylor flow regime. Many twists and turns are desirable in the catalyst. Long channels are avoided. The flow over the structured catalyst of this type is preferably always in "entrance effects", i.e., relatively short L/D. This improves mixing and minimizes the laminar flow regime. Coalescing of bubbles is not desired, but this is balanced against the need for a reasonably small pressure drop. The structured catalyst may take any of numerous shapes, preferably irregular or structured shapes promoting turbulent flow, such as the shapes dictated by the use of porous silica or alumina frit supports, porous metal gauze, ceramic foam, truncated portions or random packed segments of monoliths, or distillation column-type structured metal packings.

The structured catalyst may be formed in a many sizes, e.g., 50 microns to more than a few inches. Indeed, entire blocks of certain support structure materials might be used. For example, a substance formed by creating a support over spherical items that are then dissolved to leave a porous structure might be used in big blocks. As another example, segments of monolithic material may be used with the segments sized to prevent a Taylor flow regime.

An embodiment of the structured catalyst may be described in terms of catalyst concentration. "Catalyst concentration" is the concentration of the total catalyst solids. This can be expressed as a volume percent. In this respect, the structured catalyst preferably has at least 10 percent catalyst concentrations, and more preferably 50 percent, and more preferably still 60 percent. In cases where the catalyst has exceptionally high productivity (e.g., >>250 vol. CO conv./vol. Cat. Hr.), the catalyst concentration can be as low as 10%. The structured catalyst stands in contrast to what is possible for slurry catalyst systems. In the slurry case, the loading is limited by the slurry viscosity, which becomes very high for high loadings of small catalyst particles sizes, typically less than 25 volume percent for 50 mm particles and more importantly less than 20 vol. % for 10 mm particles. When the concentration in the slurry is increased you reach a point where the viscosity becomes very high and gas bubble size increases to the point where mass transfer limitations occurs. In contrast, the structured catalyst can be loaded into a reactor as full as physically possible and viscosity of the liquid matrix will not change-it is still liquid with a fairly low viscosity.

An embodiment of the structured Fischer-Tropsch catalyst may be described in terms of a performance. In such a case, a structured catalyst that is stationary in a reactor is capable of meeting certain minimum performance criteria-namely a sustained activity in the range of 200–4000 vol CO/vol catalyst/hour at about 420 F and preferably in the range of 400–2000 vol CO/vol catalyst/hour over a period of at least 600 hours.

The structured catalyst system may be described by the flow characteristics through it. This embodiment of the catalyst promotes turbulent non-Taylor flow for expected reactor conditions. The catalyst is shaped and packed so as to maximize axial and radial cross flow and minimize non-Taylor flow characteristics; this includes (and preferably is) a randomly packed sturctured geometry type of particle packing. This catalyst may have geometry that incorporates voidages internal to the pellets or between particles that accommodate the free flow of the liquid matrix and thereby avoids stagnant liquid except in the internal catalyst pores. Porous frits composed of metal or inorganic oxides are included. Although these catalyst do not exhibit extensive geometric symmetry as other embodiments of the structured catalyst, they possess the voidage and create the mixing regimes (laminar and non-taylor) while minimizing pressure drop.

As used in a reactor, the structured catalyst forms a packed bed that is stationary. A random structured packing of the catalyst is preferred. The lengths of the individual segments are preferably in the range of less than about ¼ inch (but may be shorter) to several feet depending upon the manufacturing process and the specific conditions required for a reactor application.

The structured Fischer Tropsch catalyst preferably minimizes the pressure drop limitations that are associated with fixed-bed reactor systems [DP $\mu$ $(1-e)^2/e^3$]. The structured catalyst allows systems to operate in a wide range of conditions including with an all-liquid feed (which preferably has a high liquid velocity), an all-gas feed embodiment, and many different gas-liquid feed ratios as will be described further below.

The embodiments with higher liquid velocities give, amongst other things, improved liquid-solid mass transfer and are believed to improve gas-liquid transfer. The high liquid velocities allow a substantial portion of the heat of reaction to be removed by the liquid. The catalyst support may be designed with diffusional lengths comparable to that associated with particle sizes commonly used in fixed-bed reactors and with voidages greater than 0.45. The voidages allow higher mass throughputs and higher heat transfer rates compared to fixed-bed reactors.

With the structured Fischer-Tropsch catalyst, intraparticle mass transfer limitations may exist when the diffusional length (catalyst particle or wall thickness) exceed approximately 300 microns.

The catalyst supports may be made from a number of substances and according to a number of methods allowing for such a structure to which an active metal is incorporated as part of the support or applied thereto as a later step. The structured support can be, for example, a monolithic catalytic support that is truncated or cut into to small fragments that are randomly packed to form a randomly packed bed that promotes non-Taylor flow. Monolithic supports are known as they have traditionally been used for gaseous reactions, such as automotive emission control systems, and have also been used for some liquid phase reactions. Typically a monolithic catalyst support is made of one or more channels or cells. If the support has more than one channel, the channels or cells are usually parallel or at least substantially parallel to each other, and may be formed with circular, hexagonal, square, triangular or irregular sections. The shape of the section of the channels is not important but a symmetric type usually results from the manufacturing process.

The catalyst support may be made by any technique known in the art. For example, a catalyst support in the form of a monolithic support segments may be made by any technique known in the art of monolithic supports including precipitation, molding, extrusion or corrugation methods. Monolithic catalyst supports may be made from any material which will not react with any of the reagents, catalytic materials, promoters, or reaction products, except where the catalyst itself forms part of the monolithic catalyst support structure. Traditional materials used for manufacturing monolith catalyst supports include ceramics, metals, alloys, plastics, resins, and even the heterogeneous catalysts itself, or mixture thereof, with an inert binder. Useful materials for making monolithic catalyst supports include aluminates, silicates, alumino silicates, natural clays, cordierite, zirconia, barium titanate, and silicon carbide. Additional materials include oxides of vanadium, chromium, zirconium, titanium, silicon, and alumina.

The structured support may be made with any geometric shape that has a bulk voidage greater than 0.45, promotes non-Taylor flow (minimizes laminar flow), has a low presure drop at high gas/liquid velocities (compared to fixed bed), and enhances the effective bed thermal conductivity compared to that typically encountered in a fixed or slurry or bubble column FT reactor. This includes, but is not limited to, hollowed cylinders, saddles, Berl saddles, Rasching rings, and wagon wheels.

The structured Fischer-Tropsch catalyst of the present invention may be made with the active metal applied directly to the support (or included directly therein) or may be applied as a coating or using any of numerous techniques known in the art. If a ceramic substrate is used, a coating of a high surface area material on which catalyst metal is deposited, i.e., a wash coat, may be desirable. In particular, the ceramic substrate is normally prepared by sintering a mold of clay or other ceramic material at a high temperature to impart density and strength. The procedure normally results in a very small surface area, and consequently, the ceramic is coated with another material having a higher surface area, as well as specific chemical characteristics on which to actually deposit the catalyst. This procedure of depositing a high surface area "wash coat" on the surface areas of the ceramic wall is known in the art. See, e.g., U.S. Pat. Nos. 2,742,437 and 3,824,196, both of which are incorporated herein for all purposes.

There are other suitable techniques for loading active metals on to a monolithic catalyst support or other supports. For example, another technique is shown in U.S. Pat. No. 5,418,204, entitled "Process for Loading Ceramic Monolith with Catalysts," which is incorporated herein for all purposes. The '204 Patent teaches using a slurry of the catalyst and a mixture of water and a liquid organic carrier.

The active metal(s) may be applied using techniques for traditional supported catalysts, such as applying the metals with incipient wetness, coprecipitation, decomposition of gas phase components (e.g., carbonyls). The methods which have been used to load catalyst on the supports include catalyst incorporation during the manufacture of the monolithic catalyst supports, deposition of active material directly onto the catalyst support, wash coating, i.e., laying down a high surface area coating onto which the catalyst is deposited or depositing the wash coat and the catalyst at the same time. Another approach to applying the active materials to the support is to contact the support at subatmospheric pressures with a slurry of the active material to fill the open pores of the material with the active material. See, e.g., U.S. Pat. No. 5,716,899, entitled "Pore-Impregnated Body and Method of Producing Same," which is incorporated herein for all purposes.

A few example embodiments and additional comments on the structured catalyst will now be presented. There are many embodiments of the structured catalyst represented by a wide range of particle geometries. All of the structured catalyst which is pertinent to this invention share one or more of the following characteristics: voidage greater than 0.45 or 0.6 allowing greater mass throughputs; random axial and radial mixing thereby eliminating or greatly reducing Taylor flow; and possessing higher thermal conductivities than inorganic oxide supports (i.e. alumina, silica, titania) typically employed for FT catalyst. See the description provided above at the beginning of this section. In the following examples, the focus is on the structured support on which the active metal is applied.

EXAMPLE 1

The first embodiment is a berl Saddle composed of low pore volume ceramic material with thin high pore volume coating. In this embodiment the structured catalyst consist of a Berl saddle such as one manufactured by Jaeger Products. The particle size can vary from 2 to greater than 15 mm in the characteristic length. The void fraction (measured as the ratio of open space to total volume for packed particles) can vary from approximately 0.58 to greater than 0.67 depending upon the characteristic length. The shape of the saddle allows extensive turbulent mixing since there are no continuous flow channels as in the case of ong monoliths or other types of packing which promote Taylor flow. This shape promotes turbulent mixing is small voidage elements which are uniformly dispersed in the axial and radial directions.

The relatively high voidage (0.65) of this support permits mass velocities as high as approximately 15–20 times greater than typical spherical, cylinder, or trilobe supports which possess voidages on the order of 0.45 to 0.5. This higher mass flow is based on the pressure drop being dependent upon the voidage in accordance to the following relationship: Pressure drop proportional to $(1-\text{voidage})^2/\text{voidage}^3$.

The random voidage zones in the axial and radial directions typically have L/D ratios much less than 10 as opposed to monolith shapes which have values exceeding 1000 only in the axial direction. These voidage zones enhance turbulence and increase the gas to liquid and liquid to solid mass and heat transfer.

The presence of the low pore volume core (i.e. <0.05 cc/gm) enhances the overall thermal conductivity of the solids by factors of 2–5 as compared to materials which have higher pore volumes (>0.25 gm/cc). The increase in thermal conductivity enhances heat transfer both axially and radially. This is be an important attribute when operating at high productivities (approximately >400 vol CO converted/vol cat-hr) in reactor systems where there are no internal heat transfer tubes for removing the heat of reaction from the reactor volume. The higher thermal conductivity allows one to limit the number of heat transfer tubes when operating with productivities in excess of approximately >800 vol CO converted/vol cat-hr).

The enhanced mass throughput combined with the increase in interphase heat and mass transfer allows the reactor system to operate at high catalyst productivities. In some instances, the internal low pore volume material may not be able to contain a sufficient amount of catalyst. An external thin coating (approximately <400 microns) of a high voidage material (approximately >0.2 gm.cc) can be employed along the all of a portion of exterior area of the structured catalyst particle in order to increase the overall productivity and take full advantage of the enhanced heat and mass transfer characteristics of the reactor.

Other shapes other than Berl Saddles may be used in a similar way. Other geometries possess the same characteristics. These include but are not limited to hollow (open) cylinders (Norton) (also referred to as Cylindrical Rings (Rauschert), Raflux rings (Rauschert), Saddles (Norton and Rauschert). Several structured catalyst that might be uased as part of the present invention are commercially produced as PENTARINGS (Norton), STARCAT (Englehardt), and CATAPAC (Saulzer). In addition to these materials, one might use a thin metal material which is twisted so as to give voidages ranging from a minimum of 0.45 to as high as possible in order to satisfy the productivity requirements of a commercial reactor system.

EXAMPLE 2

This embodiment of a structured catalyst is formed with thin metal strips. The thin metal strips (for example ¼" wide and 3" long with a thickness of ¹⁄₁₆") can be twisted so as to project a volume corresponding to 0.5 to 0.8 voidage when placed into a reactor. The thin metal strips can be coated with the appropriate high pore volume inorganic oxide necessary to promote dispersion of the active FT metal. In this example, the coating can be alumina, silica, and/or titania. The pore volume should be greater than 0.1 gm/cc or preferable <0.2 gm/cc. The thickness of the coating should be <400 microns preferable as thin as necessary to contain sufficient metal to achieve the high productivities characteristic of this type of reactor. The metal is deposited into the high pore volume material using any technique currently practiced in the art. The coated strips once loaded into a FT reactor possess the important attributes necessary for this invention.

This embodiment can be applied to any size strip ranging from a fraction to several inches in width and from one inch to several feet in length. The size and thickness of the strip is not important in establishing the desired structured catalyst properties. The extent of twisting in order to achieve the desired voidage and the coating characteristics are needed in order to achieve the desired productivities at high mass velocities.

The twisting of the metal strips allows flow to proceed under non-Taylor flow conditions with enhanced mixing both radially and axially. The high conductivity of the metal core promotes axial and radial heat transfer thereby minimizing and/or eliminating the internal heat transfer tubes (or area) necessary to remove the heat of reaction.

EXAMPLE 3

In this embodiment monolith type geometries are employed, but the channels are kept short in order to minimize and/or eliminate Taylor and/or laminar flow characteristics. In this example a 1" diameter monolith containing 10 to 500 cells per square inch can be truncated into 0.5 to 5" segments and position randomly in a reactor in order to prevent Taylor flow through continuous axial channels. The flow would contact the interior of the monolith at every conceivable angle ranging from 0 to 90 degrees. Random mixing would occur in the void space between monolith segments and within channels which were oriented to allow convective flow through the 1" diameter. Particles where the cylindrical axis of symmetry was oriented between 0 and 45 degrees to the flow would experience extensive convective mixing though the individual channels within the 1" monolith segment. Particles oriented at 90 degrees to the flow would experience little convective mixing however radial eddies and dispersion would provide mixing within the channels.

The orientation of the monolith structured catalyst would be such that it minimized and/or eliminate Taylor flow and allow random and turbulent mixing in the axial and radial directions.

In this embodiment the length of the segment would depend upon the diameter of each channel. For example, segment lengths would typically be less than 100 times the individual channel diameter in order to maximize random and turbulent mixing in both the axial and radial directions while minimizing Taylor flow.

The inner core volume of the monolith structured support can be composed of any material known in the art. In cases where this is a material with low or zero pore volume, an outer coating of higher proe volume material can be added on the external area in order to provide addition of the appropriate quantity of catalytic metal.

B. Structured Catalyst Reactor Systems and Methods

The structured catalyst may be used with numerous systems and reactors to produce heavier, longer-chain hydrocarbons as previously discussed, preferably through the Fischer-Tropsch reaction. The catalyst support may be used to form a structured Fischer-Tropsch catalyst for use as part of a system for converting synthesis gas into longer-chain hydrocarbons. Systems with Fischer-Tropsch reactor feed streams that are all gas, all liquid, or a combination of gas and liquid are possible and are described further below.

The use of the structured catalyst in a reactor taking advantage of the structured catalyst allows for much greater control of the process parameters affecting inter-phase mass and heat transfer. This is seen by contrasting it with a three-phase slurry reactor. In a three-phase slurry reactor, the overall mass transfer rate of synthesis gas into the liquid depends primarily upon the interfacial area (bubble size) and relative motion of the bubbles within the liquid continuous phase. Both the bubble size and relative motion depend upon the feed gas nozzle configuration, the catalyst particle size and volume percent loading (which affects the slurry viscosity), and the gas velocity through the bed. Small diameter nozzles (leading to small initial bubble sizes) enhance mass transfer; however, they can lead to significant catalyst attrition if the momentum (or energy) dissipation of the feed gas as it dissipates in the slurry media is too high.

Operations of a slurry reactor at high gas velocities (leading to high relative motion between the bubbles and the liquid) lead to turbulent flow with a high degree of mixing that thereby enhances interfacial mass transfer. These flow conditions, however, can lead to inadequate gas phase residence time that may limit catalyst performance. Unreacted synthesis gas exiting the three-phase reactor can be recycled back to the entrance of the reactor; however, a collection system for condensable gases and a vapor re-compression step must be added to the process. Both of these process steps may add considerable cost to a commercial system. The mass transfer of reactants from the liquid phase to the catalyst particles depends upon their relative motion. In three-phase bubble column systems, the relative motion is limited since high liquid velocities can lead to catalyst carry-over from the reactor.

Similarly in large diameter reactors, significant large-scale slurry phase mixing may be predicted to occur by essentially all three-phase hydrodynamic models. This in turn can lead to a high degree of back-mixing in the slurry phase which limits the overall kinetic driving force of the reaction. Significantly larger reactor volumes are required to achieve high conversions in reactors with a high degree of back-mixing compared to reactors which behave in a largely plug flow fashion.

In one system for utilizing the structured catalyst, the contacting of gas and the liquid occurs independent of the catalyst. Consequently, extremely high nozzle energies can be employed to fully transfer the synthesis gas into the liquid phase. The catalyst is not exposed to the high gas velocities associated with the feed gas nozzles, especially if the catalyst bed is located at some significant distance above or from the gas distribution system. Additionally since the structured catalyst is held stationary or rigidly in space through the structured packing (e.g. segments of structured catalyst held in place in a reactor vessel), the relative motion of the catalyst to the liquid is solely dependent upon the liquid velocity. Since the structured catalyst system contains high voidages, liquid velocities (e.g., >1 ft/sec) can be employed, leading to higher specific liquid to catalyst mass transfer rates than that achieved in three-phase bubble columns.

Since the liquid can be recycled, any unreacted synthesis gas remaining dissolved in the exit liquid can be returned to the reactor. In a preferred system, a pump is used for recycling the liquid. This process equipment is significantly less expensive than a collection system for condensable gases and a vapor re-compression step.

The use of structured catalyst supports essentially permits the design of a commercial Fischer-Tropsch reactor to possess a liquid continuous matrix within the liquid volume while maintaining a catalytic surface area that is stationary. Consequently, the heat transfer characteristics are believed to be equal to or better than the conventional three-phase slurry. The stationary catalytic surface facilitates scale up and avoids the complicated scale up issues associated with solids mixing and management and solid/liquid separation within the three-phase reactor volume. Using a structured catalyst with a stationary catalytic surface allows the catalyst to be used in a reactor module in which a suitable hydrocarbon liquid is passed through the reactor with or without a gas phase containing the $H_2$ and CO reactants.

Referring to FIG. 1, a system 20 is presented for illustrative purposes. System 20 is for converting shorter-chain hydrocarbons (e.g. natural gas) into longer-chain hydrocarbons (e.g., those mentioned further below) through the Fischer-Tropsch reaction. System 20 includes a synthesis-gas subsystem 24 and a synthesis subsystem 26. System 20 may further include a feed stream preparation subsystem 22, and a downstream processing subsystem 28.

Feed stream preparation subsystem 22 receives a number of feed streams that are prepared by heating or filtering or removing certain substances before providing feed streams to the synthesis gas subsystem 24. In the illustrative system, conduit 30 delivers an oxygen-containing-gas (i.e., air, enriched air or oxygen), which is preferably air, to feed stream preparation subsystem 22; conduit 32 delivers light hydrocarbons (such as natural gas); conduit 34 delivers water and/or steam; and finally conduit 36 delivers a tail gas (or residual gas) or a fuel to feed stream preparation subsystem 22. The oxygen-containing-gas delivered through conduit 30 may be filtered and heated by subsystem 22 before being delivered through oxygen-containing-gas conduit 38 to synthesis gas subsystem 24.

Light hydrocarbons delivered through conduit 32 may be heated and conditioned to remove any catalyst "poisons," such as by using zinc oxide or other suitable reactors to remove sulfur, before being delivered to conduit 40, which delivers the light hydrocarbons to synthesis gas subsystem 24. Water and/or steam delivered in conduit 34 to subsystem 22 may be heated or further heated to produce, for example, super heated steam, before being delivered through conduit 42 to synthesis gas subsystem 24. The tail gas or fuel delivered through conduit 36 may be used to heat a number of direct fire process heaters or may be used to fuel a combustor that provides motive energy for compression of air and/or light hydrocarbons. The tail gas delivered by synthesis subsystem 26 through conduit 44 may alone suffice despite being a low-BTU gas such as one containing 150 BTU/SCF, 100 BTU/SCF, or less. A suitable combustion catalyst may be added to any combustor using the tail gas delivered through conduit 44 to facilitate burning of the low BTU tail gas.

Synthesis gas subsystem 24 utilizes the feed streams delivered through conduits 38, 40 and 42 to produce synthesis gas, which is delivered through conduit 46 to synthesis subsystem 26. Synthesis subsystem 26 utilizes a system with a structured Fischer-Tropsch catalyst as described above. Synthesis subsystem 26 may include numerous types of reactors and system for utilizing the structured catalyst, such as those reactors and systems described further below.

Synthesis gas subsystem 24 may utilize an autothermal reformer, a partial oxidation reactor, or a steam reformer, but preferably includes an autothermal reformer reactor. The water/steam delivered through conduit 42 is used to adjust the carbon monoxide to molecular hydrogen ratio to between one and two in most instances. Synthesis gas subsystem 24 produces byproduct water, which is delivered to conduit 48 from where it may be disposed of or treated and put to other use in the system, such as for use as at least a portion of the feed stream delivered to conduit 34.

Synthesis subsystem 26 converts the synthesis gas delivered through conduit 46 into longer-chain hydrocarbons in the form of a light conversion product stream delivered to conduit 50 and a heavy conversion product stream 52, which may be further processed by downstream processing subsystem 28, as will be described below. The light conversion products in conduit 50 are delivered to a product storage facility such as product storage 54. Synthesis subsystem 26 produces byproduct water that is delivered to conduit 56 where it too may be disposed of or may be treated and used elsewhere within system 20. Water in conduits 56 and 48 may be treated using biological means or may be stripped of any contaminants using techniques and devices known in the art. Another byproduct from synthesis subsystem 26 is the low BTU tail gas delivered in conduit 44. The low BTU tail gas may contain some unreacted synthesis gas, light hydrocarbons ($C_5$ and less, nitrogen, $CO_2$, and other substances).

In one specific embodiment of system 20, conduit 30 contains air that is used with a feed stream preparation subsystem containing a compressor section and an expansion turbine that is driven by the tail gas of conduit 36 to compress the air for delivery to an autothermal reformer, which makes up an aspect of synthesis gas subsystem 24. The air is compressed to preferably to about 130 to 500 psia and heated to about 700–1100 F. The synthesis gas exits at about 1600–2000 F and at about 200–400 psia and is delivered to the reactor of the synthesis subsystem 26 at about 300–500 F and at about 200–500 psia after cooling and water knockout. But these are just examples, and they may vary with application and conditions. In yet another embodiment, air is delivered to conduit 30, which is delivered to a compressor, which is driven by an expansion turbine section that is motivated by the products of an autothermal reformer.

Referring again to FIG. 1, the heavy conversion product delivered into conduit 52 may be further processed by downstream processing subsystem 28. For example, downstream processing subsystem 28 may contain a hydroisomerization unit, or a hydrocracker and/or a hydrotreating process for removing olefins and/or oxygen containing products and/or other processing means to further manipulate the longer-chain hydrocarbons into desired synthetic products.

The further processed products may be delivered through conduit 60 to a storage device such as product storage 54.

In an embodiment that has an all-liquid reactor system, a gas-liquid absorption/saturator transfers CO and $H_2$ into a liquid that is then feed to the Fischer-Tropsch reactor. The liquid is contacted with a gaseous stream of $CO/H_2$ under high shear conditions to saturate the liquid. Such a system is believed to provide higher gas-liquid transport rates compared to slurry bubble columns for both gas to liquid and liquid to catalyst transport. The approach will facilitate systems like FIG. 2, but also will allow the reactor to become essentially an open pipe with an external heat exchanger (.e.g., fin-fan) if desired.

Figure 2:
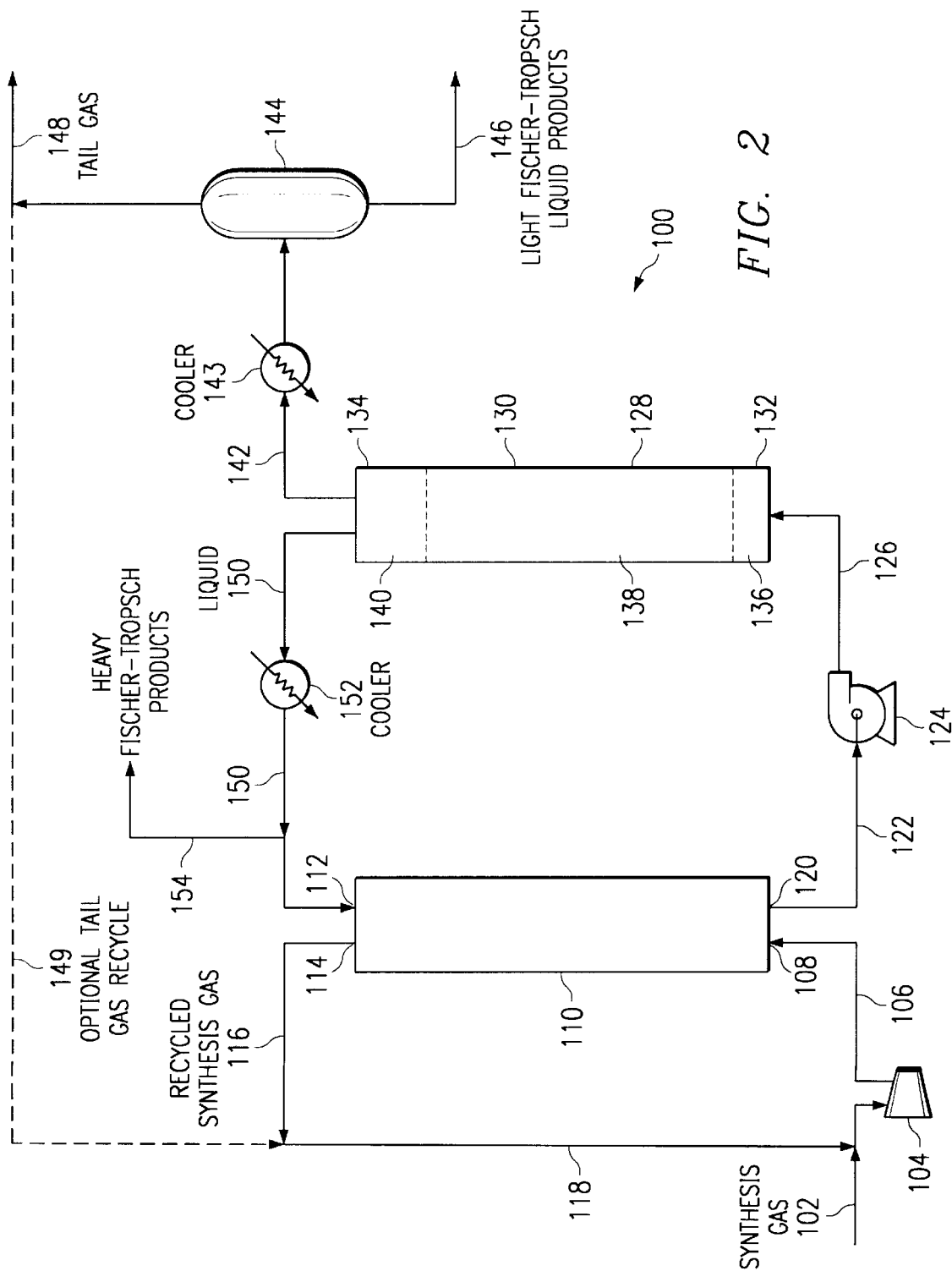
FIG. 2 is an embodiment of a Fischer-Tropsch reactor system with an all-liquid reactant feed according to an aspect of the present invention.

Referring to FIG. 2, a system 100 is presented for converting synthesis gas into longer chain hydrocarbons using a Fischer-Tropsch reaction. Synthesis gas is delivered to system 100 through conduit 102. The pressure of synthesis gas 102 may be stepped up by a synthesis gas booster compressor 104 or other means whereby the compressed synthesis gas is delivered into conduit 106 and onto a synthesis gas inlet 108 of a saturator/absorber unit 110. Saturator or absorber 110 is used to saturate a circulating hydrocarbon liquid with a synthesis gas delivered through inlet 108. In other embodiments, the saturator may be any kind of absorption system, such as a saturator tower, venturi, gas-liquid pump, etc. The circulating hydrocarbon liquid is delivered through inlet 112. Typically, not all the synthesis gas delivered to 108 will become saturated within the circulating hydrocarbon liquids, and the remaining synthesis gas is delivered to outlet 114 and on through conduit 116 to conduit 118 which is fluidly coupled to conduit 102. The saturated circulating hydrocarbon liquid exits saturator 110 through outlet 120 and is delivered through conduit 122 to a pump 124 and then on through conduit 126 to Fischer-Tropsch reactor 128. Reactor 128 contains a reactor module 130 having a first end 132 and a second end 134. Proximate the first end 132 is an introduction zone 136 that may contain a nozzle and/or a distributor for distributing the saturated liquid into a reaction zone 138 of the reactor module.

As an important aspect of the present invention, a structured Fischer Tropsch catalyst is disposed within reactor module 130 in reaction zone 138 and is used for converting the synthesis gas that is saturated in the circulating hydrocarbons into heavier hydrocarbon products. A gas/liquid separator is used to separate the liquid and gaseous products of reactor 130. The gas-liquids separator may be located in a separation zone 140 of reactor 128 or may be located externally to the reactor. The vapor or gaseous products are delivered through conduit 142, which includes cooler 143, to a cold separator 144. Cold separator 144 separates light Fischer-Tropsch liquid products delivered to conduit 146 from the residual tail gas (non-condensed gases) which is delivered to conduit 148. The light Fischer-Tropsch products delivered to conduit to 146 may go on to storage or for further processing. The tail gas delivered to conduit 148 may be flared in some circumstances or preferably utilized elsewhere within system 100 or within a larger system such as that of FIG. 1. Depending on the contents and situation in which system 100 is used, it may be desirable to recycle all or a portion of the tail gas delivered from cold separator 144 to saturator 110. This may be accomplished by recycling the tail gas through conduit 149 into conduit 118.

Liquid product from reactor 128 is delivered by conduit 150 to saturator 110. Conduit 150 includes cooler 152. A heavy Fischer-Tropsch product off-take conduit 154 is included on conduit 150. The heavy Fischer-Tropsch products of 154 may go onto storage or for further downstream processing such as that discussed in connection with downstream processing subsystem 28 of FIG. 1. The portion of the liquid continuing on through conduit 150 to saturator 110 is utilized as the circulating hydrocarbon liquid that is to be saturated with synthesis gas.

Figure 3:
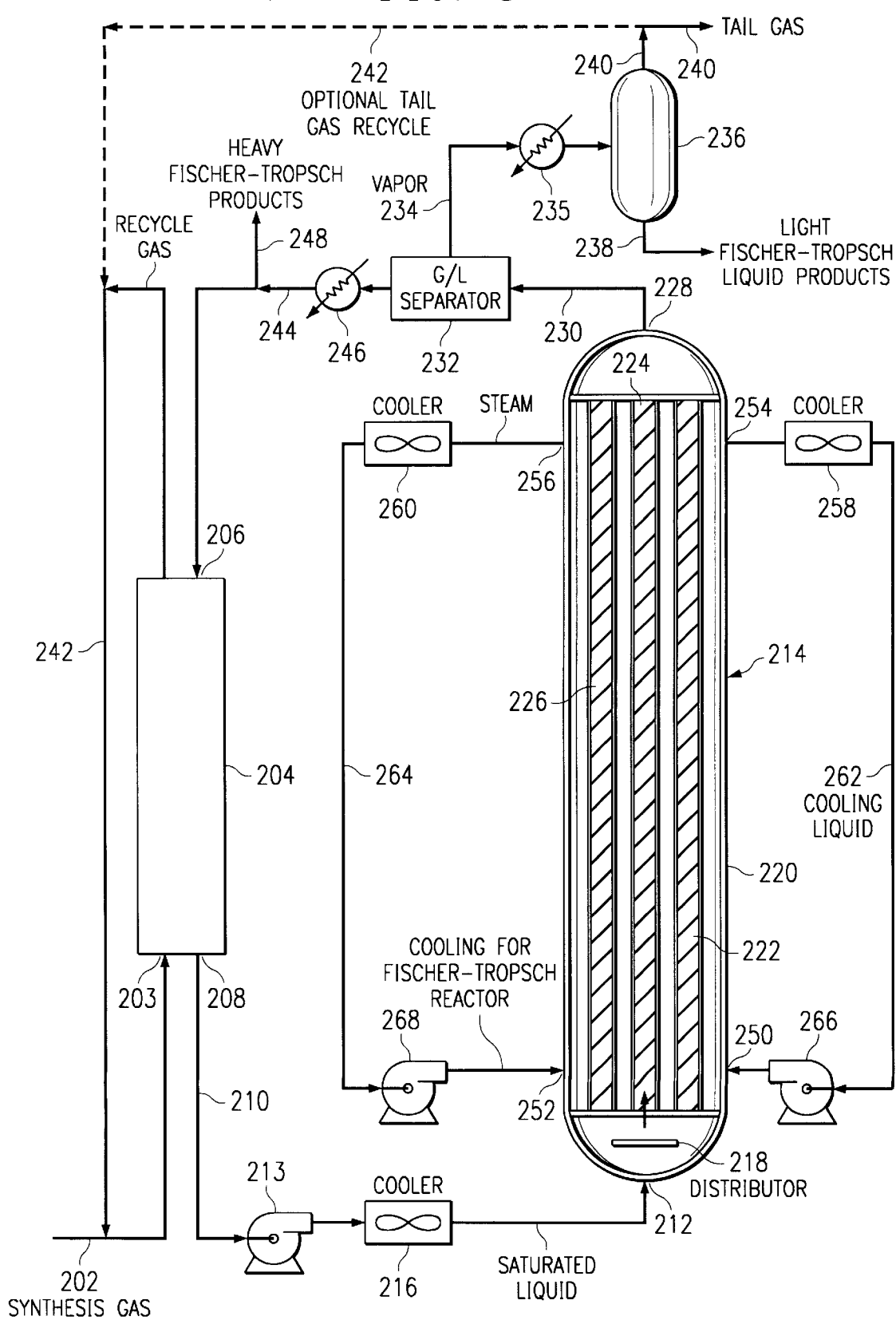
FIG. 3 is another embodiment of a Fischer-Tropsch reactor system with an all-liquid reactant feed according to an aspect of the present invention.

Referring now to FIG. 3, system 200 is shown for converting synthesis gas to longer-chain hydrocarbons using a Fischer-Tropsch reaction. Synthesis gas is delivered to system 200 through conduit 202. The synthesis gas within 202 is delivered to inlet 203 on absorber/saturator 204. A circulating hydrocarbon liquid introduced through inlet 206 of saturator 204 is saturated with synthesis gas within saturator 204 and exits through outlet 208. The saturated circulating hydrocarbon liquids are delivered from outlet 208 into conduit 210 which delivers the saturated liquid to inlet 212 of multi-tubular reactor 214. An intermediate portion of conduit 210 contains a pump 213 for providing motive force to the saturated liquid and may contain a cooler or heat exchanger 216 for removing heat from the liquid as well as other valves and devices known in the art. The saturated liquid introduced into inlet 212 is distributed by a distributor 218, which may be a nozzle subsystem.

Fischer-Tropsch reactor 214 has a reactor vessel 220 that may be a "shell and tube" arrangement containing a plurality of tubes such as representative tubes 222, 224, and 226. Distributor 218 delivers the saturated liquid introduced to reactor 214 to the various plurality of tubes, e.g. 222–226. Each of the plurality of tubes contains a structured Fischer-Tropsch catalyst. As saturated liquid flows through the plurality of tubes, the synthesis gas saturated therein is converted to Fischer-Tropsch products and the products and circulating hydrocarbon liquids exit through outlet 228 and are delivered by conduit 230 to a gas/liquid separator 232. The vapor or gaseous product portion from separator from 232 is delivered into conduit 234 from where it is delivered to a cooler 235 and then to a cold separator 236. The condensed light Fischer-Tropsch liquid products are delivered to conduit 238 from where they may proceed to storage or to further downstream processing. The uncondensed gaseous portion or tail gas is delivered into conduit 240 where it may be flared or used elsewhere in a system for converting shorter chain hydrocarbons to longer chain hydrocarbons such as shown if FIG. 1. In addition to or alternatively, the tail gas may be recycled through conduit 242 to conduit 202 to be recycled through saturator 204.

The liquid portion exiting the gas/liquid separator 232 is delivered to conduit 244 through which at least a portion is delivered to saturator 204. On conduit 244 is a cooler 246 and a heavy Fischer-Tropsch product off-take conduit 248. The heavy products in conduit in 248 may go to storage or may go for further downstream processing as previously discussed. On the "shell side" of reactor vessel 220, a cooling liquid may be introduced through a plurality of inlets such as inlets 250 and 252. If the cooling liquid is, for example, water, the resultant steam created from the heat transferred from the outer portion of the plurality of tubes exits through outlets 254 and 256.

The exiting steam may be cooled with coolers 258 and 260 respectively. The cooled streams are then delivered through conduits 262 and 264 respectively to pumps 266 and 268 from where they are introduced through inlets 250 and 252. The cooling liquid in some embodiments may actually be a portion of the circulating hydrocarbon liquids.

Referring now to FIG. 4, another embodiment, system 300, for converting synthesis gas into longer-chain hydrocarbons, is presented. Synthesis gas is delivered through conduit 302 to conduit 304 and on to reactor 306.

Reactor 306 has a reactor module 308 having a first end 310 and a second end 312. The reactor module 308 may consist of one or more tubes (or vessels) containing the appropriate amount of catalyst volume required to convert the desired throughput of CO into the desired products. The geometry of the reactor volume can consist of many individual tubes with a high L/D or a smaller amount of larger of tubes (or vessels) with a lower L/D. The structured Fischer-Tropsch catalyst is independent of the L/D of the reactor volume. The selection of the L/D for a particular application depends on the nature of the specific catalyst properties and the construction /equipment costs for a particular application. In one embodiment, reactor module 308 may be a single vessel with a L/D greater than 5.

A circulating hydrocarbon liquid is delivered through conduit 314 to conduit 304 and on to reactor 306 (a separate conduit other than 304 might also be used). Reactor module 308 has an introduction zone 316 in which the circulating hydrocarbon liquid is introduced, having been substantially saturated with the synthesis gas. The saturating of the circulating hydrocarbon liquid may occur in the introduction zone 316, in conduit 304, or in a nozzle portion 318. As will be described in connection with other embodiments, a saturator/absorber unit may be included as a separate device outside of reactor 306.

A Fischer-Tropsch-structured catalyst is disposed within module 308 in a reaction zone 320. Reactor 306 may further include a separation zone 322, which contains a gas/liquid separator but, this separator may be located outside of reactor 306 as well. In the course of upflowing the hydrocarbon liquid saturated with synthesis gas (or "saturated circulating hydrocarbons") through reactor module 308, the Fischer-Tropsch reaction occurring within reaction zone 320 converts synthesis gas dissolved in the circulating liquid into Fischer-Tropsch products and some of this synthesis gas may remain unreacted. The unreacted synthesis gas that remains in the liquid exits the reactor and is recirculated back to the inlet where it is contacted with fresh synthesis gas.

The gaseous portion of the effluent from reactor 306 is separated, which in this embodiment occurs within separation zone 322, and is delivered to conduit 324. This product gas may go on through conduit 326 for further processing, such as through a cooler and cold separator whereby light Fischer-Tropsch liquid product is obtained and sent to storage or for further processing, and a tail gas may be obtained for other uses throughout system such as shown in FIG. 1. A portion of the product gas may be delivered to conduit 328 to be recirculated and introduced with the synthesis gas in conduit 302 to conduit 304.

The liquid product is delivered to conduit 330. The liquid product in conduit 330 may go on through conduit 332 as the Fischer-Tropsch liquid product for further downstream processing or storage, and a portion of the liquid product is recirculated as the circulating liquid hydrocarbons through conduit 334. A pump 336 is included between conduits 334 and 314 to supply additional motive force to the circulating hydrocarbon liquids. As previously noted, an important aspect of this embodiment of the present invention is the use of a high flow rate to help remove heat from reactor 306. An important advantage of the system is that the high liquid flow rate through through the structured Fischer-Tropsch catalyst allows for all or a substantial portion of heat of reaction to be removed. Thus, the reactor may be designed without internal cooling devices as shown or alternatively with smaller, 5 less extensive internal cooling devices and system. Preferably, the reactor 306 is operated at or near isothermal conditions. The reactor preferably operates with a temperature increase over the entire reactor of 70 F or less, and preferably 50 F or less. This increase is relative to the temperature of the liquid in conduit 304. Conduit 338 may be used to supply a circulating hydrocarbon liquid to system 300 for purposes of starting up system 300.

The structured Fischer-Tropsch catalyst may also be used in a system with gas only as a feed to the Fischer-Tropsch reactor. An illustrative system of this type is presented in FIG. 5. Referring to FIG. 5, system 400 is a reactor system for converting synthesis gas to Fischer-Tropsch products utilizing a structured Fischer-Tropsch catalyst. Synthesis gas is delivered to system 400 through conduit 402. The synthesis gas is delivered through conduit 402 to reactor 404 where it is preferably distributed fairly uniformly through the reactor by distributor 406 from where it travels through a packed bed 408 of structured Fischer-Tropsch catalyst.

While system 400 has only synthesis gas as a feed stream, the interior portion 410 of reactor 404 is filled with a hydrocarbon liquid initially and a hydrocarbon liquid remains therein. Thus, the gas bubbles up through the liquid and bed. The interior 410 of reactor 404 has an internal heat exchange device for removing heat as represented by tubing 411. Tubing 411 receives a liquid cooling medium that boils and produces a vapor steam that then exits the reactor. Any suitable cooling fluid or system may be used to remove the internal heat.

The resultant Fischer-Tropsch products are removed through a heavy product off-take from where it may go to storage or be separated and portions delivered for downstream processing. The light effluent is removed through conduit 414 from where it may be cooled and separated with the condensed product going to storage or for processing and the light, gaseous portion going for use as a tail gas or flared. In yet another gas-only embodiment, synthesis gas may be distributed through the structured catalyst in a dry condition but heating devices such as extensive tubes will be required to remove the heat.

The two extreme end cases have been presented above: a liquid only feed stream case and a gas only feed stream case. The invention, however, further contemplates a large continuum of systems that use both gas and liquid feed streams. There are many permutations and combinations possible throughout this continuum. Some systems may have sufficient liquid rates to not require internal heat removal devices, but others will require such devices to some extent.

The gas-liquid cases can have gas and liquid feed but still some number of cooling tubes. The system may have any number of cooling tubes in the reactor depending on how much liquid is put through the reactor and whether it is desirable to do cooling of the liquid external to the reactor. The liquid flow rates may be, for example, 0 up to a value limited primarily by the pressure drop given the voidage of the structured catalyst being used and the reactor length. Rates of ½ to 1 foot/second are likely, but it will vary in each case.

For a low liquid flow rate, the system may have the same number of cooling tubes as in a no liquid flow case where all the heat is removed through internal heat exchangers. For high liquid through put, but still with a significant flow of gas, the system may have fewer cooling tubes, or none, depending on the liquid rate. With a high rate of liquid, the system have no cooling tubes in the reactor, but for other arrangements with lower and lower gas flows it becomes necessary to have an external saturator because insufficient reactant are being fed to the reactor from the gas alone. In some situations, the liquid flow may be high enough to mitigate solid-liquid boundary layer issues, but not enough to remove the heat of reaction and so internal heat exchangers will be used. As less gas flow is employed, the liquid saturation requirements get greater until the point where gas is no longer introduced directly into the reactor. The gas flow rate thus may vary over a range of 0 to as high as may be converted in the given catalyst/reactor system (i.e. the maximum rate is ultimately mass transfer limited).

The whole continuum from the no-gas/all-liquid situation to the no-liquid/all-gas situation is possible. A few examples of gas-liquid combinations follow.

Figure 6:
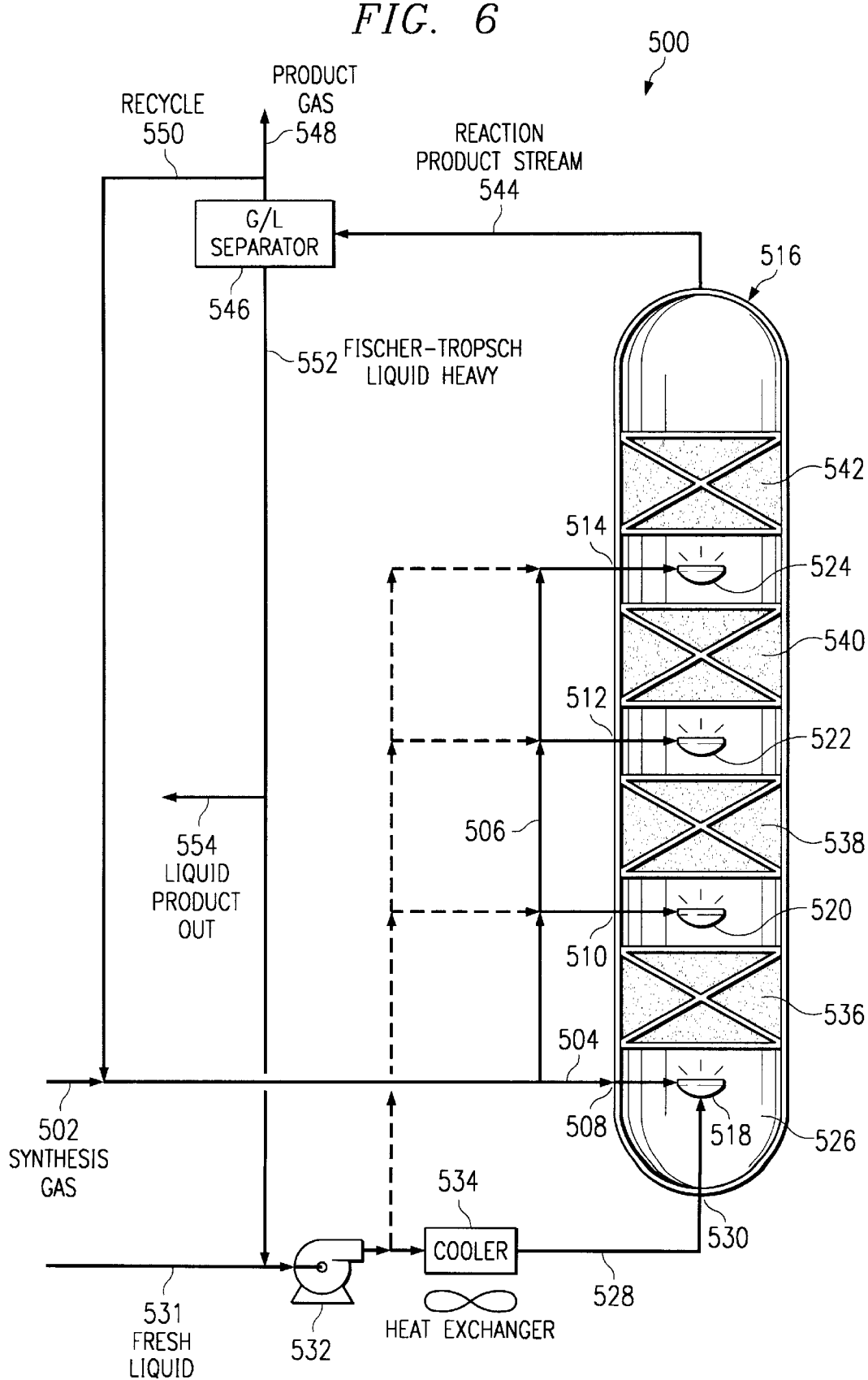
FIG. 6 is an embodiment of a Fischer-Tropsch reactor system with gas and liquid reactant feeds according to an aspect of the present invention.

Referring now to FIG. 6, system 500 for converting synthesis gas into longer chain hydrocarbons is presented. Synthesis gas is delivered through conduits 502 to conduit 504 and 506. Conduits 504 and 506 deliver the synthesis gas to a plurality of synthesis gas inlets 508, 510, 512, and 514 of reactor 516. Inlets 508–514 are preferably displaced from one another along the prominent flow path of substances flowing within reactor 516. A plurality of distributors and/or nozzles 518, 520, 522, and 524 may be associated with inlets 508–514 respectively. Proximate a first end 526 of reactor of 516, a circulating hydrocarbon liquid may be delivered through conduit 528 to inlet 530. The flow of the circulating hydrocarbon liquid within conduit 528 may be motivated by pump 532 and may be cooled with a cooler or heat exchanger 534 prior to delivery to inlet 530.

Reactor 516 contains a plurality of sites 536, 538, 540, and 542 that each contains a structured Fischer-Tropsch catalyst. As the synthesis gas delivered to inlets 508–514 flows through the various sites containing structured catalyst, Fischer-Tropsch products are produced and the products and circulating hydrocarbon liquids are delivered to conduit 544 and then to a gas/liquid separator 546. The gaseous portion is then delivered to conduit 548 which may contain an off-take conduit 550 through which all or a portion of the product gas may be recycled to include with the synthesis gas being delivered in conduit 502 and then back to reactor 516 for further conversion. The product gases delivered to conduit 548 may go to a cold separator with a portion going on to storage as a Fischer-Tropsch light product and the gaseous uncondensed portion going on for uses as a tail gas as previously described.

The liquid portion from separator 546 is delivered to conduit 552 which goes to pump 532 for delivery to reactor 516. On conduit 552 is a liquid product off-take conduit 554 the liquid product delivered to conduit 554 may go to storage or for further downstream processing as previously described. A circulating hydrocarbon liquid may be added for start up through conduit 531.

Figure 7:
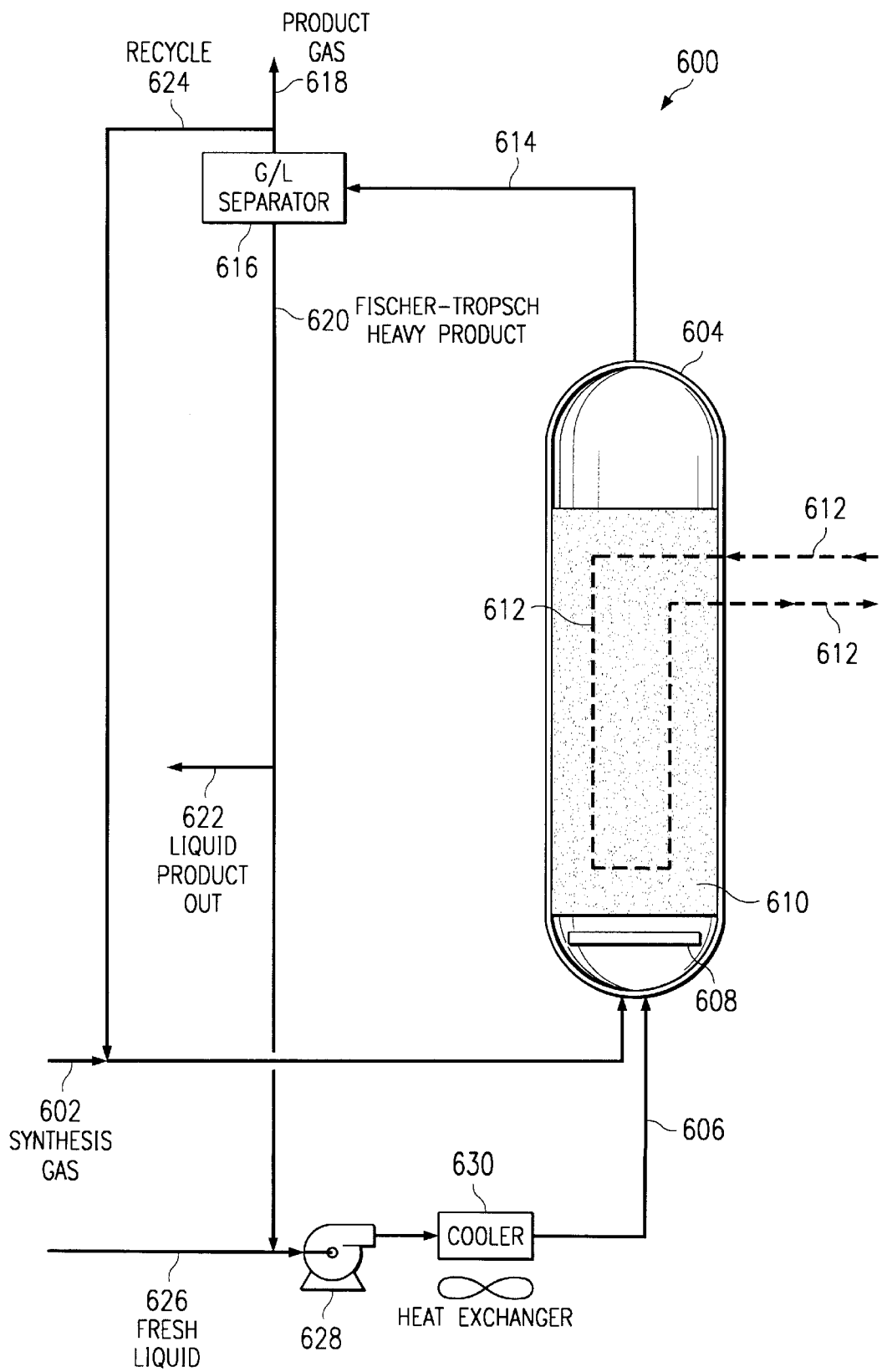
FIG. 7 is another embodiment of a Fischer-Tropsch reactor system with gas and liquid reactant feeds according to an aspect of the present invention.

Referring now to FIG. 7, another embodiment of a gas-liquid system 600 for converting synthesis gas into heavier hydrocarbons (preferably $C_{5+}$) is presented. In many respects this system is analogous to that of FIG. 6, except both liquid and gas are introduced through distributor at one end of the reactor and the optional cooling tubes are shown. Synthesis gas is delivered through conduit 602 to Fischer-Tropsch reactor 604 and conduit 606 delivers a circulating hydrocarbon liquid to reactor 604. The gas and liquid delivered to reactor 604 is distributed preferably in a uniform pattern by distributor 608 from where it bubbles or otherwise travels through a randomly packed bed of structured Fischer-Tropsch catalyst 610.

Depending on the rate of liquid flow delivered through conduit 606 and the heat removal therefrom, it may be necessary to include internal heat exchangers, such asthe representative tubes 612, that circulate a boiling feedwater that is converted to steam and removed from reactor 604. Other cooling systems or liquids may be used as well. Resultant reaction product steams exits reactor 604 through conduit 614 which delivers it to gas/liquid separator unit 616. The product gas is removed and delivered to conduit 618.

The heavy liquid product is delivered to conduit 620 from which the heavier FT product is removed by conduit 622 and the remaining portion continues for a recycle pass through reactor 604. Similarly, a portion of the product gas may be recycled through conduit 624, which delivers it to conduit 602. The recycled liquid and any fresh liquid (used primarily for start-up) flow through conduit 626 to pump 628 and a cooler 630 before going through conduit 606 to the reactor 604. Cooler 630 may be any heat exchanger but is preferably a fin-fan cooler. No saturator is involved with this embodiment, but as discussed above, a saturator could be added as the design of the gas-liquid combination is varied.

The systems presented do not have problems with separating the catalyst from the wax since the structured catalyst remains in the reactor. Further, start-up and shut-down are relatively easy because they will not plug the distributor-it is a steady state distribution. Catalyst break through is also not an issue. The structured catalyst remains in the reactor.

C. Example Products and Environments

The structured catalysts, reactors, systems, and methods of the present invention are preferably used to convert synthesis gas into longer-chain hydrocarbons, e.g., the full spectrum of $C_{5+}$ products through the Fischer-Tropsch reaction (but the invention further has application with other non-Fischer-Tropsch processes). The longer-chain Fischer-Tropsch products that may be made directly or with downstream processing include numerous products for numerous uses. A number of examples are presented below.

The Fischer-Tropsch products (as used in a broad sense to include FT wax plus downstream processing) may include synthetic alpha olefins adapted for many applications, including, without limitation, PAO feedstock (alpha olefins in the range of $C_6$ to $C_{12}$ and preferably $C_{10}$ are used to produce poly alpha olefins); alpha olefins for laundry and other detergents (preferably $C_{12}$–$C_{16}$); chlorination stock to be used in textiles, pharmaceuticals and transportation lubricants/hydraulic fluids (preferably $C_{18}$–$C_{24}$); alpha olefins used to produce particle board emulsions and poly vinyl chloride lubricants ($C_{24}$–$C_{28}$); and alpha olefins used to manufacture decorative and industrial candles, particle board emulsions and PVC lubricants ($C_{30+}$ alpha olefins, which are considered a synthetic paraffin wax and therefore used in many of the markets where paraffin waxes are used). The Fischer-Tropsch products are also well suited for use as a synthetic white oils because Fischer-Tropsch liquid normal paraffins meet FDA specifications governing their use in direct food contact applications, which gives them a wide range of potential markets to enter, including markets which traditionally use food grade mineral oils. Similarly, the Fischer-Tropsch product may be used for technical grade mineral or white oils that are used to produce paints, stains and inks, among other end-use products and may be used as a pharmaceutical (USP) grade white oil to be used to produce cosmetics and healthcare products. In these applications, Fischer-Tropsch products are better because the raw liquid or hydroisomerized product can probably satisfy ASTM standards with little effort.

The Fischer-Tropsch products may also be used for synthetic liquid n-paraffins in numerous applications. The Fischer-Tropch product may be used as a chlorination feedstock to be used, for example, to produce chlorinated normal paraffins for use in textiles and industrial lubricants. The product may also be used as a linear alkyl benzene (LAB) feedstock ($C_{10}$ to $C_{13}$) which may be used for laundry detergents. The Fischer-Tropsch product may also be used as an aluminum rolling oil ($C_{14}$ to $C_{17}$), e.g., for cold rolling oils for aluminum foil. Further the Fischer-Tropsch product N-paraffin may be used for "liquid" candles.

The Fischer-Tropsch product may be used as a synthetic wax in numerous applications. For example, the product may be used to make thermostat wax, which is used primarily to control automobile thermostats. The wax is particularly suitable for this since it must be uniform in molecular weight, carbon number distribution and molecular structure. The Fischer-Tropsch wax may be used to make hotmelt adhesives, i.e., used as a viscosity modifier for industrial hotmelt adhesives. The synthetic wax may be used in printing inks. In that case, the wax is used as an antiscuff surface modifier for fine grade web offset and gravure inks. It may also be used for paints and stains. The wax is used to enhance water repellency of water-based paints and stains. The Fischer-Tropsch product may be used to make corrugated board in which the waxes are used to add strength and water repellency to the corrugated board. Similarly, the Fischer-Tropsch product may also be used as a wax for packaging and food additives.

The synthetic wax may be used as a PVC lubricant/extrusion aid; the high melting point waxes are used as internal/external lubricants for PVC extrusion. The wax may be used as a flushing compound, to impart the dripless quality to decorative candles, with cosmetics as a viscosity modifier and melting point enhancer, to bind various drugs which are in powdered form into tablet form (they also impart a slippery surface to tablets such as aspirin, etc.). Waxy Fischer-Tropsch products may also be used as plasticizers and extrusion aids for various plastics such as high density polyethylene, PET linear low density polyethylene and polypropylene. Another use is as anti-ozone additives to protect the outside surfaces of rubber products from packing and ozone damages.

Fischer-Tropsch product in the form of synthetic lubricants may be used in numerous additional applications. For example, the synthetic lubricants may be used as environmentally friendly drilling fluids. Fischer-Tropsch oils may be used to produce highly stable high temperature operation automatic transmission fluids. They may also be used as a hydraulic fluid that is very stable at high temperatures and ideally suited for use in vehicular and industrial hydraulic compounds. The synthetic lubricants may also be used as vehicular lubricants (PCMO and HDD). The Fischer-Tropsch product in the form of a synthetic lubricant may be used as a quenching oil or cutting oil. Further they may be used for a plurality of specialty lubricants such as for two-cycle, marine lubricants, or baroil. They may also be used as a vehicle for lubricant-additives.

An exciting aspect of the products that may be made from or as part of the Fischer-Tropsch products are synthetic fuels and blends, including Fischer-Tropsch compression ignition fuels, Fischer-Tropsch spark ignition fuels, feedstocks for fuel cells, aviation fuel (turbine and spark-ignition) and railroad fuels. The sulfur (and aromatic) free clean nature of the synthetic fuels thus made are advantageous.

The Fischer-Tropsch products may also be used as synthetic solvents. As such, the uses of the synthetic solvents include as printing inks, paints, stains, drying agents, dye transfer agents, synthetic heptane, hexane, and de-waxing agents.

The process, such as that presented in connection with FIG. 2, may be adapted with other plants for additional purposes and may also be modified for application in the various environments throughout the world. Fischer-Tropsch plants can be built in a number of different settings, which will, by definition, determine some of the plant characteristics. The following is a list of some of the settings in which Fischer-Tropsch plants may be applied. The character of these plants will be controlled by factors including weather conditions, specifically whether it is tropical or temperate, or arctic settings, as well as local conditions, such as wind, wave action, altitude and precipitation.

Land-based plants imply the absence of water, and can have permanent or temporary foundations. Sites will range from sea level to elevations limited by turbine capability. Further adjustments are made for certain plant conditions such as arctic weather conditions on the North Slope. Riverine/Deltaic Fischer-Tropsch plants generally are capable of accommodating fluctuating water levels due to flood conditions, consolidated soil, regional subsidence, and other dynamic conditions common to this setting. Intratidal Fischer-Tropsch plants include many of the same conditions as Riverine/Deltaic Fischer-Tropsch plants, but also include design consideration known in the art for tides and wave motion. Open water Fischer-Tropsch plants are engineered to accommodate wind and waves motions found in open marine conditions.

Numerous platform options are available for Fischer-Tropsch plants to help accommodate their application in the various settings and conditions. The following listing is a brief characterization of bases or platforms on Fischer-Tropsch plants may be mounted. A barge-mounted Fischer-Tropsch plant may be used in marine, intratidal, and Deltaic/Riverine settings. The Fischer-Tropsch plants may be made from materials ranging from metal to concrete. A plant may be mounted on a floating production storage and off-take (FPSO) or other vessel primarily for an open marine condition(s), and may be utilized under conditions similar to FPSO ships used today. The plants may be modular (e.g., steel skid-mounted containers). These modular Fischer-Tropsch plants are subdivided into modules on steel skid-mounted containers for efficient transport, setup, connect and disconnect. Modular Fischer-Tropsch plants may range in sizes from small enough for shipment by rail to large enough to be carried as a heavy lift from a barge or ship. The plants may also be spar/offshore platform mounted Fischer-Tropsch plants. These Fischer-Tropsch plants are mounted on offshore and open marine settings spar or platforms, either retrofitted onto platforms that were previously designed for offshore oil and gas production or on platforms built specifically for the Fischer-Tropsch plant. The Fischer-Tropsch plant on a vessel may also be modified for use in recovering and converting hydrates from the ocean floor. These are but a few examples.

In addition to these platforms and settings, the plants may be oriented toward numerous other or additional applications. For example, the plant may be an aspect of a desalination plant. These Fischer-Tropsch plants are designed to use Fischer-Tropsch process heat from the Fischer-Tropsch and syngas reactions to convert available water into water suitable for agriculture, industrial or portable water. The desalination may be by reverse osmosis or thermal desalination.

D. Conclusion

Although the present invention and its advantages have been described in detail, it should be understood that various changes, substitutions and alterations can be made therein without departing from the spirit and scope of invention as defined by the appended claims. For example, elements shown in one specific embodiment presented for illustrations purposes may be combined with elements from another embodiment such as adding the saturator of FIG. 3 to the embodiment of FIG. 7. Furthermore, it is to be understood that numerous additional valves and components, known in the art but not necessary to present the invention, may be added throughout the embodiments shown. Further still, it should be understood that while the Fischer-Tropsch reaction is the preferred synthesis reaction, other synthesis reactions might be used.

What is claimed is:

1. Method for converting synthesis gas into Fischer-Tropsch products through the Fischer-Tropsch reaction, the method comprising the steps of:

delivering CO and $H_2$ to a reactor having a structured Fischer-Tropsch catalyst diposed in the reactor, wherein the structured Fischer-Tropsch catalyst includes at least one structure having a catalytic surface, a linear dimension exceeding 20 millimeters, a void ratio exceeding 0.6, and a contour that causes a non-Taylor flow when the CO and $H_2$ pass through the structure; and causing the CO and $H_2$ to flow through the reactor, whereby the structured Fischer-Tropsch catalyst converts at least a portion of the CO and $H_2$ into Fischer-Tropsch products.

2. The method of claim 1 wherein:

the step of delivering CO and $H_2$ to the reactor comprises the steps of saturating a hydrocarbon liquid with synthesis gas and delivering the saturated hydrocarbon liquid to the reactor;

the step of causing the CO and $H_2$ to flow through the reactor comprises causing the saturated hydrocarbon liquid to flow through the structured Fischer-Tropsch catalyst; and the method further comprises the step of maintaining conditions in the reactor to substantially prevent the saturated hydrocarbon liquid from vaporizing while the saturated hydrocarbon liquid is flowing through the structured Fischer-Tropsch catalyst.

3. The method of claim 1 wherein the step of delivering CO and $H_2$ to the reactor comprises the step of delivering synthesis gas to the reactor.

4. The method of claim 1 wherein the step of delivering CO and $H_2$ to the reactor comprises the steps of:

saturating a hydrocarbon liquid with synthesis gas, delivering the saturated hydrocarbon liquid to the reactor, and delivering synthesis gas to the reactor.

5. The method of claim 1 wherein:

the step of delivering CO and $H_2$ to a reactor comprises delivering CO and $H_2$ to a reactor having a structured Fischer-Tropsch catalyst fixed in the reactor such that the structured Fischer-Tropsch catalyst remains substantially stationary when the CO and $H_2$ flows through the structured Fischer-Tropsch catalyst.

6. The method of claim 5 wherein:

the structured Fischer-Tropsch catalyst comprises a bed of catalyst supports with catalytic surfaces, each of the catalyst supports having a linear dimension exceeding 20 millimeters; and the step of causing the CO and $H_2$ to flow through the reactor comprises causing the CO and $H_2$ to flow through the bed of catalyst supports.

7. The method of claim 2 wherein:

the structured Fischer-Tropsch catalyst comprises a bed of catalyst supports with catalytic surfaces, each of the catalyst supports in the bed having a linear dimension exceeding 20 millimeters; and the step of causing the saturated hydrocarbon liquid to flow through the structured Fischer-Tropsch catalyst comprises:

causing the saturated hydrocarbon liquid to flow through the bed of catalyst supports; and holding the catalyst supports substantially stationary, relative to each other, while the saturated hydrocarbon liquid flows through the bed of catalyst supports.

8. The method of claim 7 wherein:

the bed of catalyst supports comprises two or more catalyst supports, each catalyst support having a shape selected from the group consisting of rings, Rasching rings, wagon wheels, substantially hollow cylinders, saddles, and Berl saddles; and the step of causing the saturated hydrocarbon liquid to flow through the structured Fischer-Tropsch catalyst comprises causing the saturated hydrocarbon liquid to flow through the two or more catalyst supports.

9. The method of claim 1 wherein:

the structured Fischer-Tropsch catalyst comprises a monolithic catalyst support having at least one channel with catalytic surfaces, the monolithic catalyst support having a linear dimension exceeding 25 millimeters; and the step of causing the CO and $H_2$ to flow through the reactor comprises causing the CO and $H_2$ to flow through the monolithic catalyst support.

* * * * *

(12) REEXAMINATION CERTIFICATE (4702nd)
United States Patent
Arcuri et al.

(10) Number: US 6,262,131 C1
(45) Certificate Issued: Dec. 31, 2002

(54) STRUCTURED FISCHER-TROPSCH CATALYST SYSTEM AND METHOD

(75) Inventors: Kym B Arcuri, Tulsa, OK (US); Mark A. Agee, Tulsa, OK (US); Kenneth L. Agee, Bixby, OK (US)

(73) Assignee: Syntroleum Corporation, Tulsa, OK (US)

Reexamination Request:
No. 90/006,174, Dec. 26, 2001

Reexamination Certificate for:
Patent No.: 6,262,131
Issued: Jul. 17, 2001
Appl. No.: 09/455,047
Filed: Dec. 6, 1999

Related U.S. Application Data

(60) Provisional application No. 60/111,312, filed on Dec. 7, 1998, and provisional application No. 60/148,805, filed on Aug. 12, 1999.

(51) Int. Cl.[7] ............................. C07C 27/00; B01J 23/02
(52) U.S. Cl. ................. 518/700; 518/706; 502/527.18; 502/527.19; 502/527.23
(58) Field of Search ................................. 518/700, 706; 502/527.23, 527.18, 527.19

(56) References Cited

U.S. PATENT DOCUMENTS 5,786,393 A    7/1998  Chaumette et al. ......... 518/700

OTHER PUBLICATIONS

Database CAplus on STN, Chemical abstract (Columbus, Ohio), CA:129:6200, Zhao Yu–Long, et al., "Concentration Profile of Reactants in Fe Catalysts for Slurry Fischer–Tropsch Synthesis," Proc. Anuu. Int. Pittsburgh Coal Conf. (1997), 14th, entire document, S24/23–S24/29.

PCT Written Opinon dated Feb. 22, 2001 for International application No. PCT/US99/28905.

PCT Preliminary Examination Report dated Jul. 31, 2001 for International application No. PCT/US99/28905.

*Primary Examiner*—Samuel Barts

(57) ABSTRACT

A Fischer-Tropsch catalyst for the conversion of synthesis gas into Fischer-Tropsch products includes a stationary Fischer-Tropsch catalyst having a voidage ratio greater than approximately 0.45 or 0.6 and may further have a catalyst concentration for a given reactor volume of at least 10 percent. A Fischer-Tropsch catalyst has a structured shape promoting non-Taylor flow and/or producing a productivity in the range of 200-4000 vol. CO/vol. Catalyst/hour or greater over at least a 600 hour run of a Fischer-Tropsch reactor with the catalyst therein. A system for converting synthesis gas into longer-chain hydrocarbon products through the Fisher-Tropsch reaction has a reactor for receiving synthesis gas directly or as a saturated hydrocarbon liquid or a combination, and a stationary, structured Fischer-Tropsch catalyst disposed within the reactor for converting at least a portion of the synthesis gas into longer-chain hydrocarbons through Fischer-Tropsch reaction. A Fischer-Tropsch reactor system having a structured Fischer-Tropsch catalyst may have an all-liquid saturated reactant feed, an all gas reactant feed, or a plethora of combinations, therebetween. The systems may or may not include heat removal devices. Methods of manufacturing catalysts and converting synthesis gas are also presented.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–9 is confirmed.

\* \* \* \* \*